US008820569B2

(12) United States Patent
Kabasawa et al.

(10) Patent No.: US 8,820,569 B2
(45) Date of Patent: Sep. 2, 2014

(54) FUEL CONTAINER, FUEL RESIDUAL AMOUNT MEASUREMENT DEVICE, AND FUEL RESIDUAL AMOUNT MEASUREMENT METHOD

(75) Inventors: Yasunari Kabasawa, Hanno (JP); Yoshihisa Suda, Maebashi (JP); Takahiro Osada, Sawa-gun (JP); Kozi Nishimura, Takasaki (JP); Toshimi Kamitani, Fujioka (JP)

(73) Assignees: Casio Computer Co., Ltd., Tokyo (JP); Mitsubishi Pencil Co., Ltd., Tokyo (JP)

( * ) Notice: Subject to any disclaimer, the term of this patent is extended or adjusted under 35 U.S.C. 154(b) by 2727 days.

(21) Appl. No.: 11/304,208

(22) Filed: Dec. 15, 2005

(65) Prior Publication Data

US 2006/0151495 A1 Jul. 13, 2006

(30) Foreign Application Priority Data

Dec. 17, 2004 (JP) ................................. 2004-366119
Feb. 17, 2005 (JP) ................................. 2005-040654

(51) Int. Cl.
*B65D 25/04* (2006.01)
*B65D 1/24* (2006.01)
*B65D 85/00* (2006.01)
*H01M 8/04* (2006.01)
*H01M 8/06* (2006.01)
*H01M 8/10* (2006.01)

(52) U.S. Cl.
CPC ............ *H01M 8/04208* (2013.01); *Y02E 60/50* (2013.01); *H01M 8/04089* (2013.01); *H01M 8/0618* (2013.01); *Y02E 60/522* (2013.01); *H01M 8/04186* (2013.01); *H01M 2008/1095* (2013.01)

USPC ......... 220/529; 220/4.02; 220/4.12; 220/544; 429/515; 73/290 R

(58) Field of Classification Search
USPC ................ 220/4.02, 4.12, 529, 544; 429/515; 73/290 R
See application file for complete search history.

(56) References Cited

U.S. PATENT DOCUMENTS

| 6,610,433 | B1 | 8/2003 | Herdeg et al. |
| 7,489,859 | B2 * | 2/2009 | deVos et al. ................... 392/441 |

(Continued)

FOREIGN PATENT DOCUMENTS

| EP | 1 432 286 A2 | 6/2004 |
| JP | 05-031881 A | 2/1993 |

(Continued)

OTHER PUBLICATIONS

Japanese Office Action dated Sep. 14, 2010 (and English translation thereof) in counterpart Japanese Application No. 2005-040654.

(Continued)

*Primary Examiner* — Fenn Mathew
*Assistant Examiner* — Madison L Poos
(74) *Attorney, Agent, or Firm* — Holtz Holtz Goodman & Chick PC

(57) ABSTRACT

A fuel container includes a container body having a fuel discharge port and an interior spacing. A body of liquid fuel is filled in the interior spacing of the container body. Follower units are provided in the container body, in contact with at least a part of an end of the body of the liquid fuel. Solid follower auxiliary members are interposed between the follower units and the body of liquid fuel to be optically detectable.

8 Claims, 20 Drawing Sheets

(56) References Cited

U.S. PATENT DOCUMENTS

| | | |
|---|---|---|
| 2004/0013928 A1 | 1/2004 | Yamauchi et al. |
| 2004/0096721 A1 | 5/2004 | Ohlsen et al. |
| 2004/0131903 A1 | 7/2004 | Shioya |
| 2005/0069746 A1 | 3/2005 | Kabasawa |
| 2005/0152568 A1 | 7/2005 | Roeck |

FOREIGN PATENT DOCUMENTS

| | | | |
|---|---|---|---|
| JP | 2001-93551 A | 4/2001 | |
| JP | 2004-281340 A | 10/2004 | |
| WO | WO 03/009410 A2 | 1/2003 | |
| WO | WO 2005/031903 A2 | 4/2005 | |

OTHER PUBLICATIONS

A Korean Office Action (and English language translation thereof) dated Apr. 29, 2008, issued in a counterpart Korean Application.

Japanese Office Action dated Aug. 3, 2010 (and English translation thereof) in counterpart Japanese Application No. 2004-366119.

European Office Action dated Oct. 22, 2012 (in English) issued in counterpart European Application No. 05 819 905.0.

\* cited by examiner

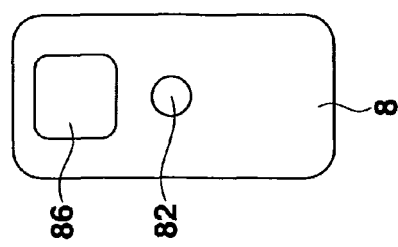
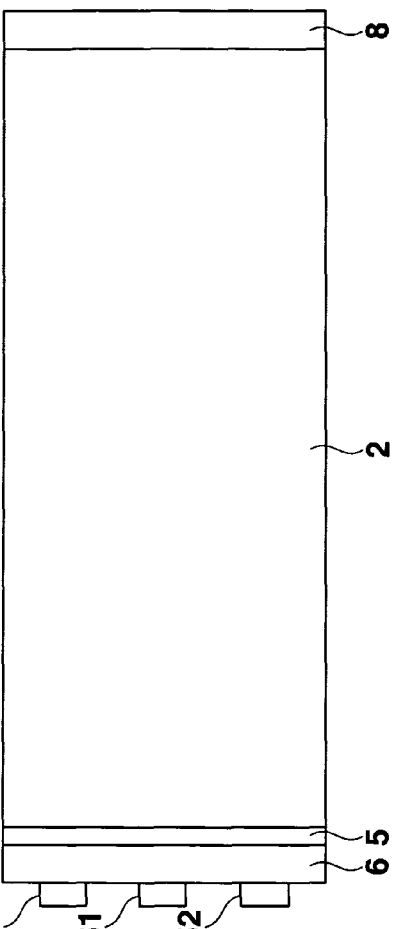
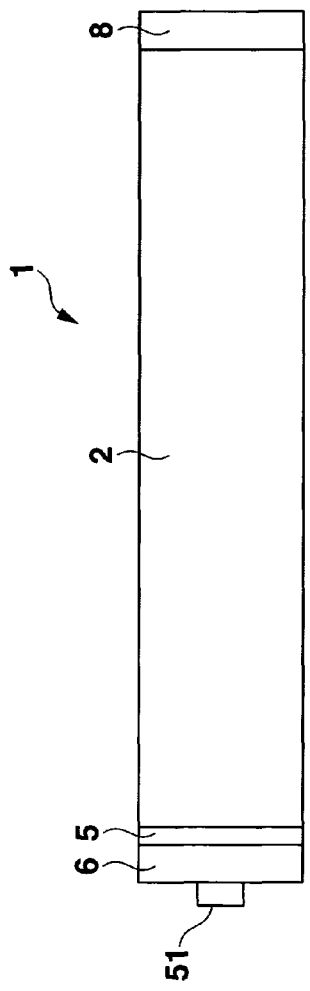
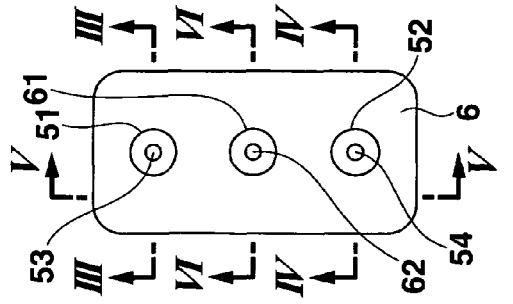

FUEL CONTAINER, FUEL RESIDUAL AMOUNT MEASUREMENT DEVICE, AND FUEL RESIDUAL AMOUNT MEASUREMENT METHOD

CROSS-REFERENCE TO RELATED APPLICATIONS

This application is based upon and claims the benefit of priority from prior Japanese Patent Applications No. 2004-366119, filed Dec. 17, 2004; and No. 2005-040654, filed Feb. 17, 2005, the entire contents of both of which are incorporated herein by reference.

BACKGROUND OF THE INVENTION

1. Field of the Invention

The present invention relates to a fuel container containing liquid fuel and to a fuel residual amount measurement method and device for measuring the residual amount of the liquid fuel.

2. Description of the Related Art

Over recent years, remarkable progress and development have been made in the field small electronic devices such as mobile phones, notebook personal computers, digital cameras, wrist watches, personal digital assistance (PDA), and electronic notes. As power sources in such electronic devices, there are used primary cells such as alkali dry cells and manganese dry cells, and secondary cells such as nickel-cadmium storage cells and lithium ion cells. However, from the viewpoint of energy utilization efficiency, it cannot be said that effective utilization of energy is normally implemented in the primary cells and secondary cells. Nowadays, extensive research and development are in progress for fuel cells that are capable of realizing high energy utilization efficiency as alternatives for primary cells and secondary cells, as described and shown in Jpn. Pat. Appln. KOKAI Publication No. 2001-93551.

A fuel cell as described in Jpn. Pat. Appln. KOKAI Publication No. 2001-93551 is configured to include: a fuel cell body configured such that an electrolytic plate is interposed between a fuel electrode and an air electrode; and a fuel container which contains a liquid mixture of liquid fuel such as methanol, and water and which is connected to the fuel cell body. The fuel container is formed with a discharge port through which the liquid mixture is supplied. When having been empty, the fuel container can be replaced with a new fuel container.

Recently, it is desired that the residual amount of liquid fuel in a fuel container is measured. In this case, however, a sensor is necessary that detects liquid fuel existing in the fuel container to measure the residual amount of the liquid fuel. In this connection, suppose now that the fuel cell described in Jpn. Pat. Appln. KOKAI Publication No. 2001-93551 is mounted in a small electronic device as mentioned above. In this case, since the electronic device and the fuel container are used in various posture and directions, so that the liquid fuel flows to various positions corresponding to the posture. Consequently, the liquid fuel existing in the liquid fuel cannot be sensed by the sensor, and hence the residual amount of the liquid fuel in the fuel container cannot be measured.

BRIEF SUMMARY OF THE INVENTION

The present invention is intended to provide a fuel container and a fuel residual amount measurement method capable of easily measuring the residual amount of liquid fuel.

A fuel container according to a first aspect of the present invention, there is provided a fuel container comprising:
a container body having a fuel discharge port and an interior spacing;
a body of liquid fuel being filled in the interior spacing of the container body;
a follower unit in contact with at least a part of an end of the body of the liquid fuel; and
a solid follower auxiliary member which is interposed between the follower unit and the body of liquid fuel and which is optically detectable.

A fuel container according to a second aspect of the present invention, there is provided a fuel container comprising:
a container body in which liquid fuel is stored and a fuel discharge port to discharge the liquid fuel to the outside is formed;
a sense object which seals a rear end of a body of the liquid fuel in the container body.

A fuel residual amount measurement apparatus according to a third aspect of the present invention, there is provided a fuel residual amount measurement device comprising:
a storage section which stores a fuel container having a sense object which seals a rear end of a body of liquid fuel in a container body; and
position detecting means for measuring a position of the sense object.

A fuel residual amount measurement method for measuring the residual amount of liquid fuel contained in a fuel container, according to a fourth aspect of the present invention, there is provided a fuel residual amount measurement method for measuring a residual amount of liquid fuel of a fuel container, comprising
preparing the fuel container including a follower unit in contact with at least a part of an end of the liquid fuel filled in an interior spacing of a container body having a fuel discharge port, and a solid follower auxiliary member which is interposed between the follower unit and the liquid fuel and which is optically detectable, and
detecting a position of the follower auxiliary member.

According to the present invention, an end of the liquid fuel in noncontact with the body of the container of the liquid fuel moves in conjunction with discharging or reduction of the liquid fuel. Concurrently, the follower unit and the follower auxiliary member move following the movement, so that the residual amount of the liquid fuel can be measured by detecting the position of the follower auxiliary member.

BRIEF DESCRIPTION OF THE SEVERAL VIEWS OF THE DRAWING

FIGS. 1A to 1D are outline views of a fuel container according to one embodiment of the present invention, in which FIG. 1A is a front view, FIG. 1B is a top view, FIG. 1C is a rear view, and FIG. 1D is a side view.

DETAILED DESCRIPTION OF THE INVENTION

Figure 2:
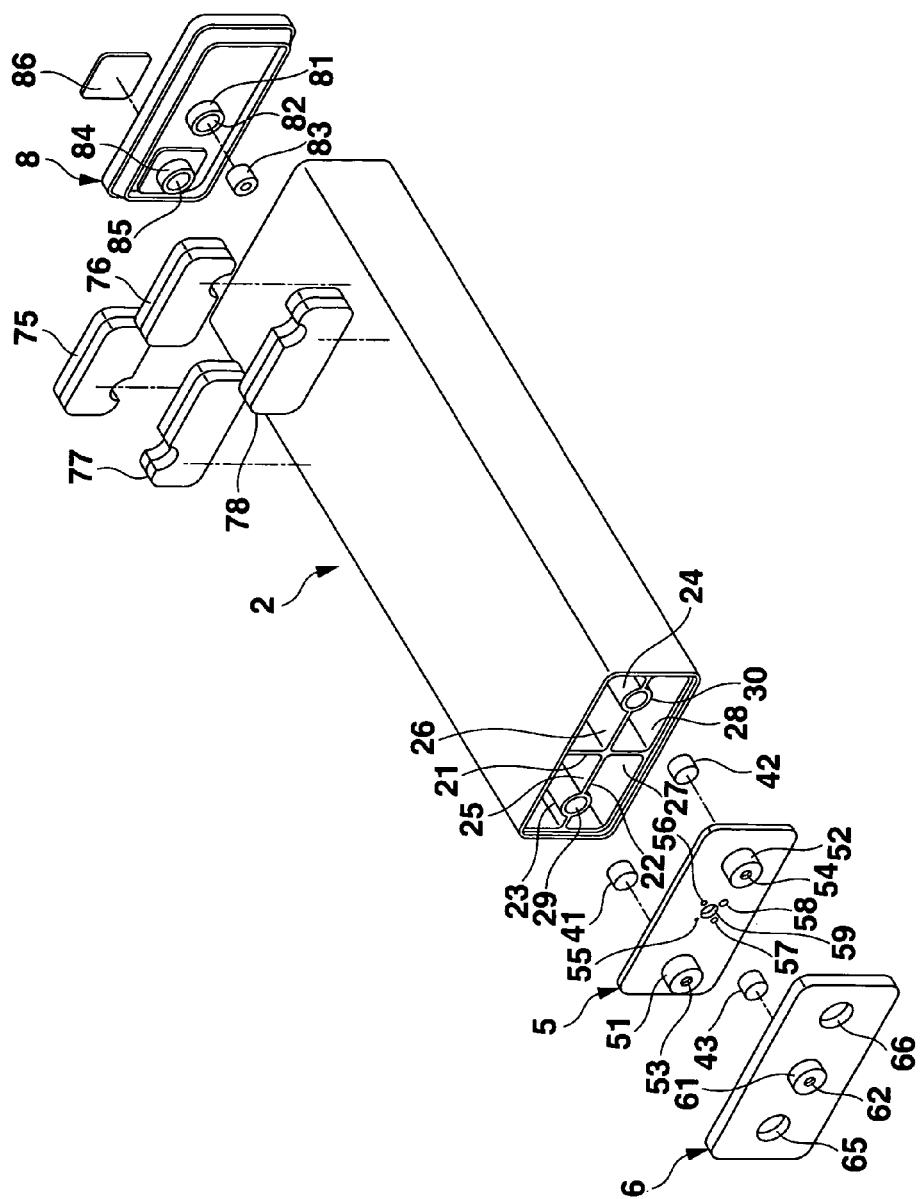
FIG. 2 is an exploded perspective view of the fuel container.

A best mode for practicing the present invention will be described herebelow with reference to the drawings. It is to be understood that while technically preferable limitations and/or restrictions are provided to practice the present invention, the scope of the present invention is not limited to embodiments and examples described below and shown in the drawings.

Figure 3:
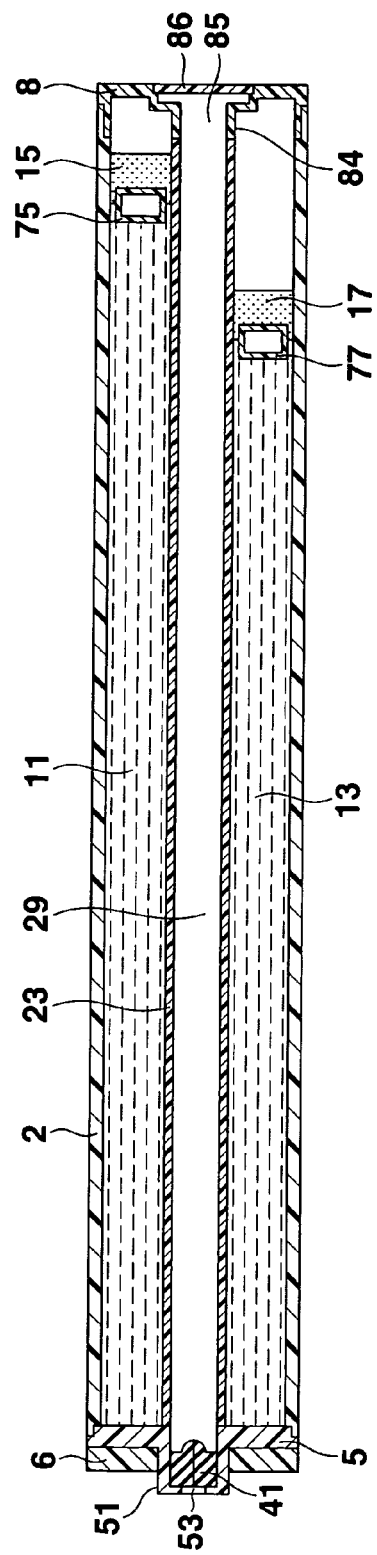
FIG. 3 is a cross sectional view taken along the line III-III of FIG. 1A.
Figure 4:
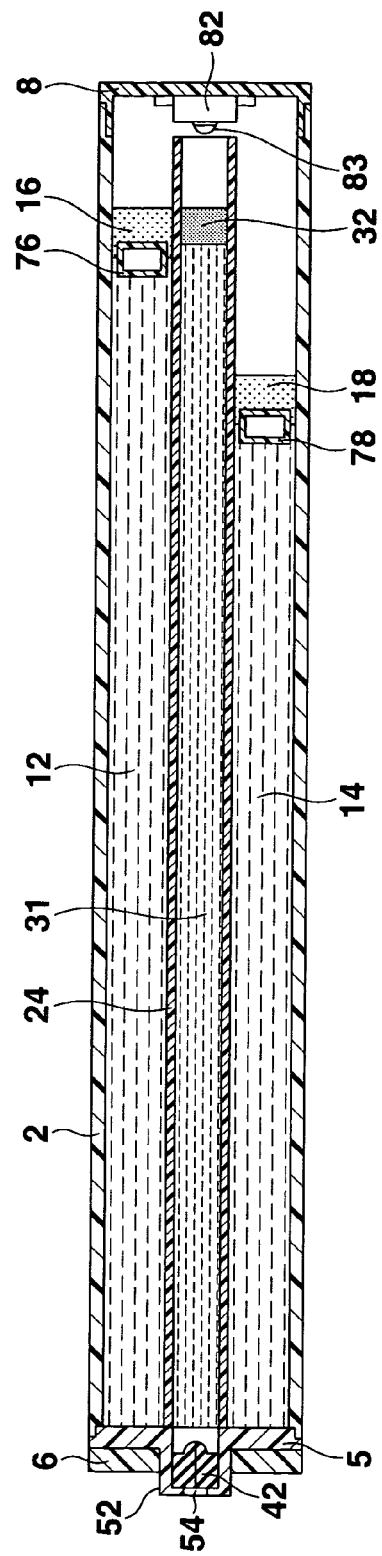
FIG. 4 is a cross sectional view taken along the line IV-IV of FIG. 1A.
Figure 5:
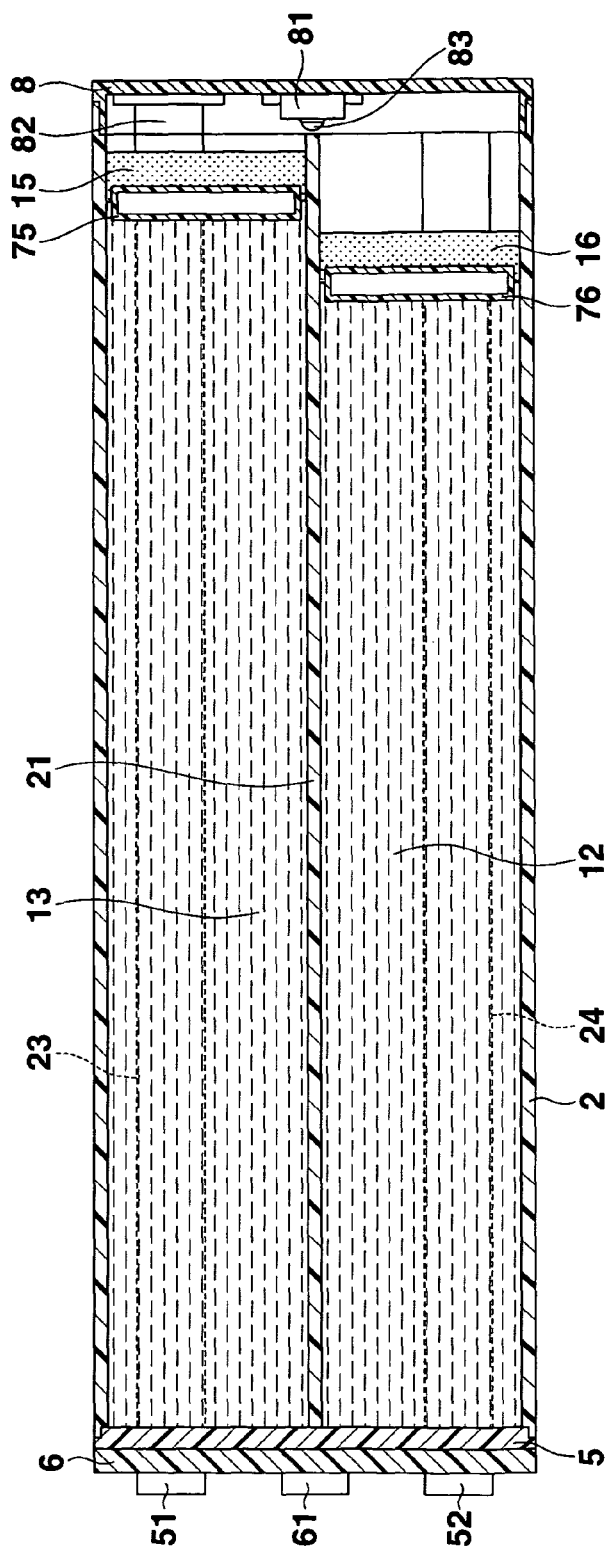
FIG. 5 is a cross sectional view taken along the line V-V of FIG. 1A.
Figure 6:
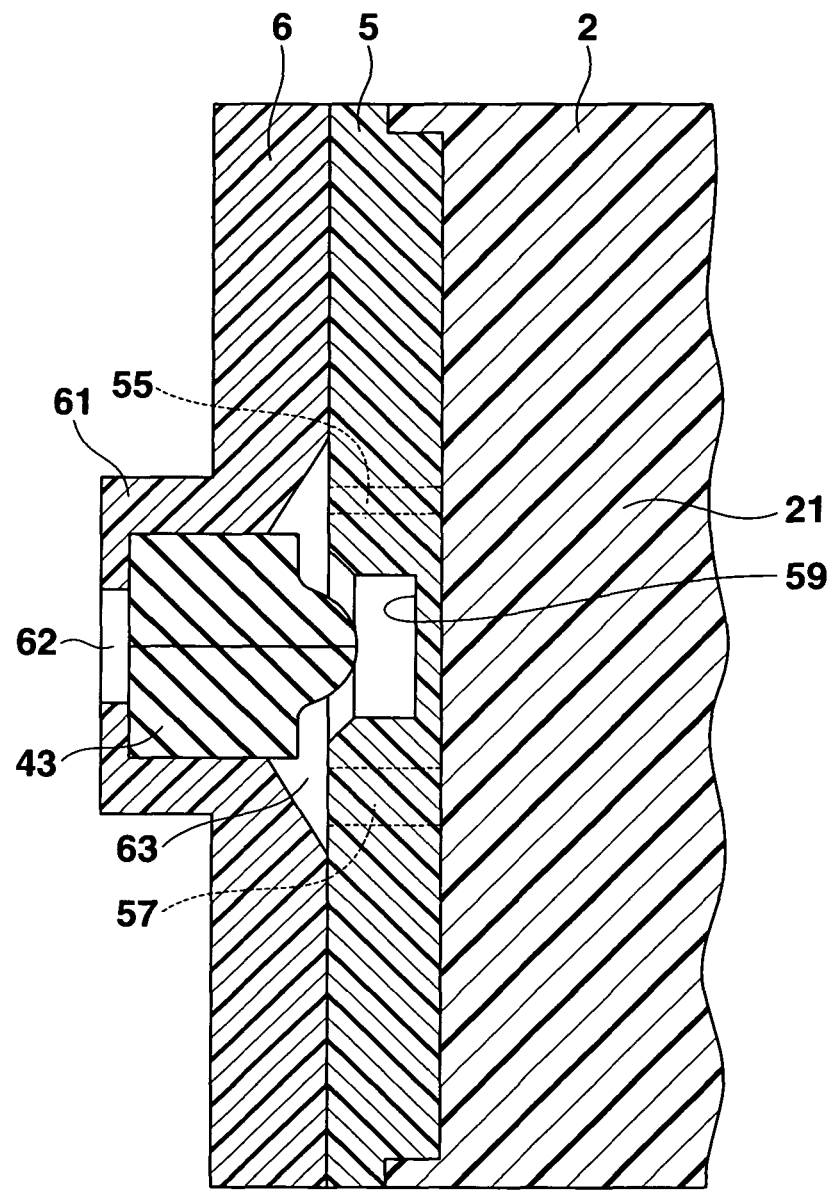
FIG. 6 is a cross sectional view taken along the line VI-VI of FIG. 1A.

FIGS. 1A to 1D are four views of a fuel container 1 according to an embodiment to which the present invention is adapted. FIG. 1A is a front view, FIG. 1B is a top view, FIG. 1C is a rear view, and FIG. 1D is a left view. FIG. 2 is an exploded perspective view showing front, upper, and right sides of the fuel container 1. FIG. 3 is a cross sectional view taken along the line III-III of FIG. 1A. FIG. 4 is a cross sectional view taken along the line IV-IV of FIG. 1A. FIG. 5 is a cross sectional view taken along the line V-V of FIG. 1A. FIG. 6 is a cross sectional view taken along the line VI-VI of FIG. 1A. More specifically, FIG. 6 is an enlarged view of the fuel container 1.

As shown in FIGS. 1A to 6, the fuel container 1 has a container body 2 having an interior spacing; a front internal lid member 5 that blocks a front opening of the container body 2; a front external lid member 6 provided to overlap with a front surface of the front internal lid member 5; and a rear lid member 8 that blocks a rear opening of the container body 2.

The container body 2 is formed into a shape like a substantially parallelepiped box, in which front and rear ends are open to define the front and rear openings.

In the container body 2, a vertical partition wall 21 parallel to left and right side walls of the container body 2, a horizontal partition wall 22 parallel to an upper face and bottom face of the container body, and circular pipe portions 23 and 24 are integrally formed to the partition wall 22. As viewed from the front side, the partition wall 21 is provided midway along the right-left direction. The partition wall 22 is provided midway along the vertical direction. The partition wall 21 crosses with the partition wall 22, thereby forming a "+" shaped wall. The pipe portion 23 is provided leftward of the partition wall 21, and the pipe portion 24 is provided rightward of the partition wall 21. The pipe portions 23 and 24 extend in the front-rear direction, and are open at front and rear ends.

The interior spacing of the container body 2 is separated by the vertical partition wall 21 into left and right spacings, and is separated by the horizontal partition wall 22 into upper and lower spacings. Thus, the interior spacing is partitioned by the partition walls 21 and 22 into four cross-sectional rectangular fuel storage spacings 25 to 28. A spacing 29 is formed in the one side pipe portion 23 in the interior thereof, and a spacing 30 is formed in the other side pipe portion 24 in the interior thereof. Consequently, the interior spacing of the container body 2 is separated into six spacings 25 to 30. With the partition walls 21 and 22 thus provided in the container body 2, the container body 2 can be reinforced to the extent that the container body 2 is not easily be deformed by external forces.

Each of the inside diameter and outside diameters of the pipe portion 23 is uniform in the longitudinal direction. Also, each of the inside diameter and outside diameter of the pipe portion 24 is uniform in the longitudinal direction. The inside diameter and outside diameter of the pipe portion 23 are the same as the inside diameter and outside diameter of the pipe portion 24. Accordingly, the volume and opening area of the spacing 29 are the same as the volume and cross sectional area of the spacing 30, and the volumes and opening areas of the respective fuel storage spacings 25 to 28 are all the same.

The partition walls 21 and 22 and the pipe portions 23 and 24 are formed integral with the left and right sidewalls and upper and bottom walls of the container body 2. The container body 2 has in all or part high transmission characteristics for light of wavelength zones received and sensed by optical sensors, and is preferably transparent for visible light. A material usable for the container body 2 may include, for example, resin, glass, china, and/or ceramics. However, in consideration of gas impermeability and cost reduction in manufacture and assembly and manufacturability, it is preferable that the material is any one of or a mixture of at least two resins of, for example, polypropylene, polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride. Alternatively, a preferable material of the container body 2 includes, for example, a single-layer structure or multilayer structure of two or more layers, including a layer formed by coating alumina, silica, and diamond-like carbon (DLC) on the aforementioned resin or resin mixture surface. In the case of a multilayer structure, as long as at least one layer of the structure is formed of a resin having high gas shielding characteristics, no problems occur during practical use even in the case where other layers have not high gas shielding characteristics.

Follower auxiliary members 75 to 78 are disposed in the fuel storage spacings 25 to 28, respectively. Each of the respective fuel storage spacings 25 to 28 is separated by the follower auxiliary member into a front region and a rear region. The follower auxiliary members 75 to 78 are internally hollow planar members and are solid not having liquidity to provide predetermined density in cooperation with follower units 15 to 18. The follower auxiliary members 75 to 78, preferably, each have at least a part that has a color different from the color of a below-described liquid fuel 11, that preferably is chromatic, that more preferably is non-transparent, and that more preferably has high reflectivity. A material usable to form the follower auxiliary members 75 to 78 may include, for example, polypropylene, ethylene-vinyl alcohol copolymer resin, polyacrylonitrile, nylon, polyethylene terephthalate, polycarbonate, polystyrene, polyvinylidene chloride, polyvinyl chloride, various kinds of rubber and a mixture thereof.

As viewed from the front, the outer peripheral shapes of the follower auxiliary members 75 to 78 are similar to the opening shapes of the fuel storage spacings 25 to 28. The areas of the respective follower auxiliary members 75 to 78 are preferably 50% or greater, and more preferably in the range from 80 to 99% with respect to the opening areas of the fuel storage spacings 25 to 28. The follower auxiliary members 75 and 77 are guided by the pipe portion 23 along the forward-rearward direction. The follower auxiliary members 76 and 78 are guided by the pipe portion 24 along the forward-rearward direction.

A rear part of the front internal lid member 5 is inserted into the front opening of the container body 2. A rear face of the front internal lid member 5 is brought into close contact with the front end faces of the partition walls 21 and 22 and the pipe portions 23 and 24. Thus, the front openings of the spacings 25 to 30 are closed by the front internal lid member 5. Cylindrical nipple portions 51 and 52 are protrudingly provided at the front face of the front internal lid member 5, and an air discharge port 53 and a water discharge port 54 are formed in the nipple portions 51 and 52, respectively. The air discharge port 53 or through hole is through-formed from a top end portion of the nipple portion 51 to the rear face of the front internal lid member 5. The air discharge port or through hole 54 is through-formed from a top end portion of the nipple portion 52 to the rear face of the front internal lid member 5. The air discharge port 53 communicates with the spacing 29, and the water discharge port 54 communicates with the spacing 30.

A check valve 41 that prevents the flow of air directed to the outside of the container body 2 through the air discharge port 53 from the spacing 29 is inserted into the air discharge port 53. A check valve 42 that prevents the flow of water directed outward of the container body 2 through the water discharge port 54 from the spacing 30 is inserted into the water discharge port 54. With the check valves 41 and 42 thus provided, fluid (air and water) is prevented from unnecessarily flowing out of the inside of the container body 2 even when external forces are exerted on the container body 2 in an unused mode of the fuel container 1.

Figure 7:
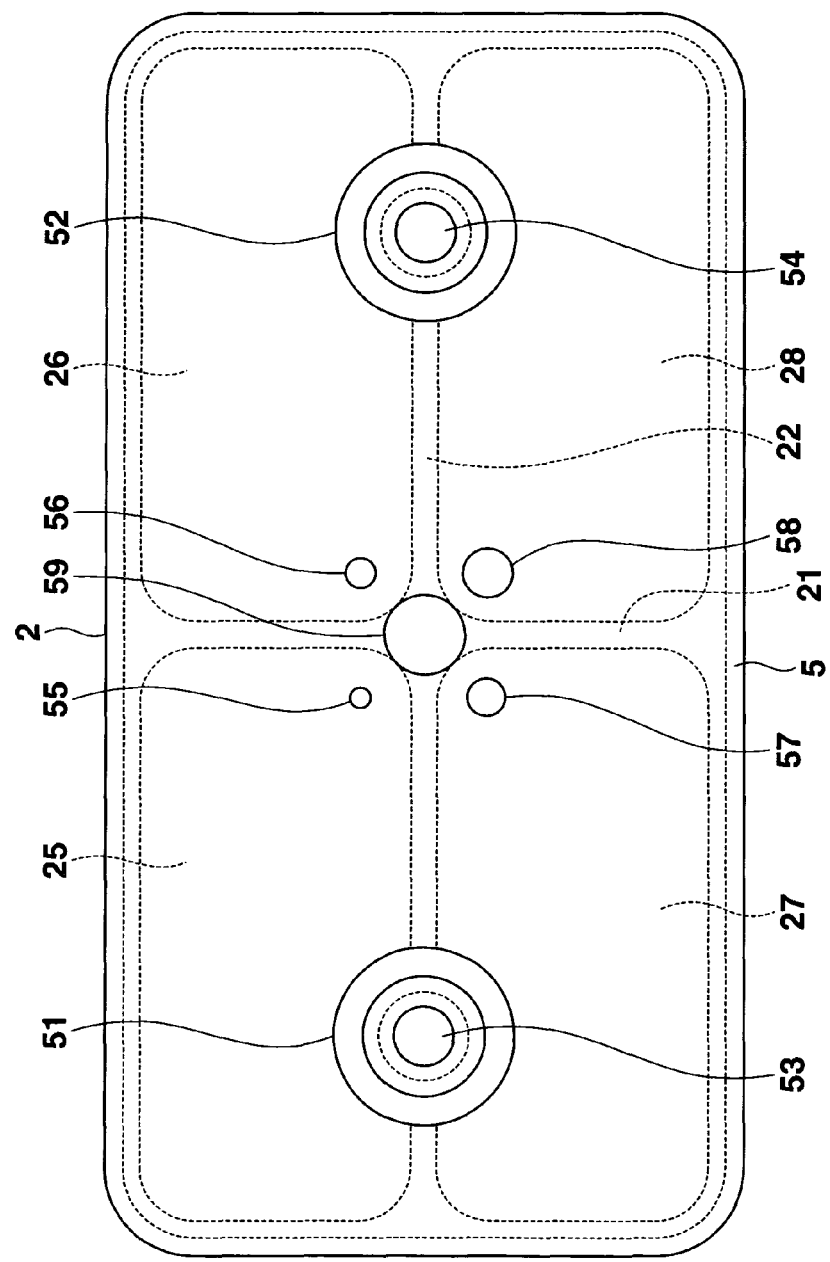
FIG. 7 is an enlarged front view of a front internal lid member for the fuel container.

FIG. 7 is a front view showing the state in which the front external lid member 6 is removed. As shown in FIG. 7, a circular recess portion 59 is formed in a central portion of the front face of the front internal lid member 5. Four circular communication holes 55 to 58 are formed around the recess portion 59. The communication holes 55 to 58 extend through from the front face to the rear face of the front internal lid member 5, and are in communication to the respective fuel storage spacings 25 to 28. Among the communication holes 55 to 58, the opening area of the communication hole 55 is smallest, the opening area of the communication hole 56 is second smallest, the opening area of the communication hole 57 is third smallest, and the opening area of the communication hole 58 is largest. Since the communication holes 55 to 58 are circular, also the diameters thereof are smaller in the order of the communication holes 58, 57, 56, and 55.

As shown in FIGS. 1 to 6, the front external lid member 6 is overlapped with the front face of the front internal lid member 5, and the rear face of the front external lid member 6 is in close contact with the front face of the front internal lid member 5. As shown in FIG. 2, a cylindrical nipple portion 61 is protrudingly provided in a central portion of the front face of the front external lid member 6, and a fuel discharge port 62 is formed in the nipple portion 61. The fuel discharge port 62 is through-formed from a top end portion of the nipple portion 61 to the rear face of the front external lid member 6. The fuel discharge port 62 communicates with the recess portion 59 in the internal member 5. In more particular, as shown in FIG. 6, a rear opening 63 of the fuel discharge port 62 is formed to laterally expand. As such, the area of the circular cross section of the opening 63 is larger than that of the recess portion 59, in which the communication holes 55 to 58 around the recess portion 59 are merged and brought into communication to the rear opening 63 of the fuel discharge port 62.

As shown in FIGS. 2 and 6, a check valve 43 that prevents the flow of fluid directed to a front opening of the fuel discharge port 62 through the fuel discharge port 62 from the rear opening 63 is inserted into the fuel discharge port 62. With the check valve 43 thus provided, fluid is prevented from unnecessarily flowing from the rear opening 63 to the front opening of the fuel discharge port 62.

Each of the check valves 41 to 43 is a duckbill valve, which is fabricated by forming an elastic material into a duckbill shape. The check valves 41 to 43 are each situated in the state that a duckbill-shaped end is directed to the inside of the container body 2. Usable materials of the check valves 41 to 43 include synthetic resins such as polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride; and rubber or elastomers such as natural rubber, isoprene rubber, butadiene rubber, 1,2-butadiene rubber, styrene butadiene rubber, chloroprene rubber, nitrile rubber, butyl rubber, ethylene propylene rubber, chlorosulfonated polyethylene, acryl rubber, epichlorohydrin rubber, polysulfide rubber, silicone rubber, fluorine rubber, and urethan rubber.

As shown in FIG. 2, through holes 65 and 66 are formed in the front external lid member 6. As shown in FIGS. 1A to 5, the nipple portion 51 is inserted through the through hole 65 to thereby extend forward of the front face of the front external lid member 6. In addition, the nipple portion 52 is inserted through the through hole 66 to thereby extend forward of the front face of the front external lid member 6.

A front part of the rear lid member 8 is inserted into the rear opening of the container body 2, and a front inner face of the rear lid member 8 is spaced away from rear end faces of the partition walls 21 and 22 and the pipe portions 23 and 24. A cylindrical nipple portion 81 is protrudingly provided in a central portion of the front inner face of the rear lid member 8, and a pressure regulation opening 82 is formed in the nipple portion 81. The pressure regulation opening 82 is through-formed from a top end portion of the nipple portion 81 to the rear face of the rear lid member 8. Also a top end of the nipple portion 81 is spaced away from the rear end faces of the partition walls 21 and 22, and the pressure regulation opening 82 communicates to the fuel storage spacings 25 to 28 and the spacing 30.

A check valve 83 that prevents the flow of fluid directed to the outside of the container body 2 through the pressure regulation opening 82 from the interior of the container body 2 is inserted into the pressure regulation opening 82. The check valve 83 does not have to be provided depending on the case. In the case of provision, the check valve 83 is preferably a duckbill valve is preferably used that is fabricated by forming an elastic material into a duckbill shape. In this case, the check valve 83 may preferably be situated in the state that a duckbill-shaped end is directed toward the inside of the container body 2. Usable materials of the check valve 83 include synthetic resins such as polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride; and rubber or elastomers such as natural rubber, isoprene rubber, butadiene rubber, 1,2-butadiene rubber, styrene butadiene rubber, chloroprene rubber, nitrile rubber, butyl rubber, ethylene propylene rubber, chlorosulfonated polyethylene, acryl rubber, epichlorohydrin rubber, polysulfide rubber, silicone rubber, fluorine rubber, and urethan rubber.

A cylindrical nipple portion 84 is protrudingly provided at the front inner face of the rear lid member 8 on the left side of the pressure regulation opening 82, and an air induction opening 85 is formed through the nipple portion 84. The air induction opening 85 is through-formed from a top end portion of the nipple portion 84 to the rear face of the rear lid member 8. In addition, the nipple portion 84 is inserted into a rear opening of the pipe portion 29, and the air induction opening 85 communicates with the spacing 29 of the pipe portion 29.

The rear opening of the air induction opening 85 is expanded in a rectangular shape. An rectangular air filter 86 is inserted into the air induction opening 85, in which the air induction opening 85 is closed by the air filter 86.

In the fuel storage spacing 25 of the container body 2, the liquid fuel 11 is stored in a region frontward of the follower auxiliary member 75. In addition, as shown in FIG. 3, a follower unit 15 including liquid, sol, or gel having low affinity for the liquid fuel 11 is stored in a region rearward of the liquid fuel 11, whereby the fuel storage spacing 25 is closed by the follower unit 15. The fuel storage spacing 25 is thus separated by the follower unit 15 into the region frontward of the follower unit 15 and the region rearward of the follower unit 15. The follower units 15 to 18 bury clearances between the follower auxiliary members 75 to 78 and the container body 2, thereby to prevent leakage of liquid fuel 11 from clearances between the follower auxiliary members 75 to 78 and the container body 2. The follower auxiliary member 75 is provided in a contact portion between the liquid fuel 11 and the follower unit 15, in which a front portion of the follower auxiliary member 75 is immersed in the liquid fuel 11, and a rear portion of the follower auxiliary member 75 is immersed in the follower unit 15.

Similarly as in the fuel storage spacing 25, in the respective fuel storage spacings 26 to 28, the bodies liquid fuels 12 to 14 are respectively stored, the liquid fuels 12 to 14 are sealed by the follower units 16 to 18, and the follower auxiliary members 76 to 78 are respectively provided between the liquid fuels 12 to 14 and the follower units 16 to 18.

The bodies of liquid fuel 11 to 14 is liquid of the same type which is achromatic and transparent, such as methanol. However, fuels such as alcohols and compounds containing hydrogen elements may be used. Before the fuel container 1 is used, the stored amounts of the liquid fuel 11 to 14 are all the same.

Achromatic and transparent water 31 is stored in the pipe portion 24, as shown in FIG. 4. A follower unit 32 composed of liquid, sol, or gel is stored in a region rearward of the water 31 in the pipe portion 24, in which the pipe portion 24 is closed by the follower unit 32 at its rear end. A region frontward of the follower unit 32 is filled with the water 31, in which the water 31 and the follower unit 32 are in contact with each other, and the water 31 is sealed by the follower unit 32.

While maintaining the interfaces with the bodies of liquid fuel 11 to 14, the follower units 15 to 18, respectively, move toward the bodies of liquid fuel 11 to 14. The movement is done as the rear ends of the bodies of liquid fuel 11 to 14 move in association with discharging of the bodies of liquid fuel 11 to 14 from the fuel discharge port 62. Thereby, the bodies of liquid fuels 11 to 14 are prevented from leaking and evaporating, and air is prevented from flowing into the bodies of liquid fuel 11 to 14. The follower unit 32 moves in contact with the water 31 in conjunction with consumption of the water 31, thereby to prevent leakage and evaporation of the water 31 and to prevent entrance of air into the water 31.

The follower units 15 to 18, respectively, are low in affinity with respect to the bodies of liquid fuel 11 to 14, and are neither dissolved nor diffused in the liquid fuel 11 to 14, and more preferably, are lower in surface energy than the liquid fuel 11 to 14. The follower unit 32 has affinity lower than the water 31, and is neither dissolved nor diffused with the water 31, and more preferably, has lower surface energy than the water 31.

The follower units 15 to 18 and 32 each have the characteristics of structural viscosity fluid (anomalous viscosity fluid) in which nominal stress decreases as distortional stress (or, distortional velocity) increases.

A usable material of the follower units 15 to 18 and 32 includes polyglycol, polyester, polybuten, liquid paraffin, spindle oil, and other mineral oils; dimethylphenyl silicone oil, methylphenyl silicone oil, and other silicone oils; aliphatic metal soap, denatured clay, silica gel, carbon black, natural rubber, synthetic rubber, and other synthetic polymers; and combinations thereof. Alternatively, viscosity-improved materials by adding solvent to the aforementioned materials may be used as the follower units 15 to 18 and 32.

Thus, the follower units 15 to 18, respectively, seal the bodies of liquid fuel 11 to 14 without providing clearances therebetween, and have appropriate viscosity. For this reason, even when the fuel container 1 is swung or is moved into a tilted posture, the shape and position thereof are about to be maintained. Consequently, the positions of the respective follower auxiliary members 75 to 78 as well remain positioned at all times between follower units 15 to 18 and the ends of the bodies of liquid fuel 11 to 14. Therefore, as the residual amounts of the bodies of liquid fuel 11 to 14 are smaller, the follower auxiliary members 75 to 78 are positioned toward the side of the fuel discharge port 62, that is, on the side of the front external lid member 6. Alternatively, as the residual amounts of the bodies of liquid fuel 11 to 14 are greater, the follower auxiliary members 75 to 78 are positioned toward the side of the rear lid member 8. Accordingly, the residual amounts of the bodies of liquid fuel 11 to 14 can be measured by detecting the positions of the follower auxiliary members 75 to 78.

Figure 8:
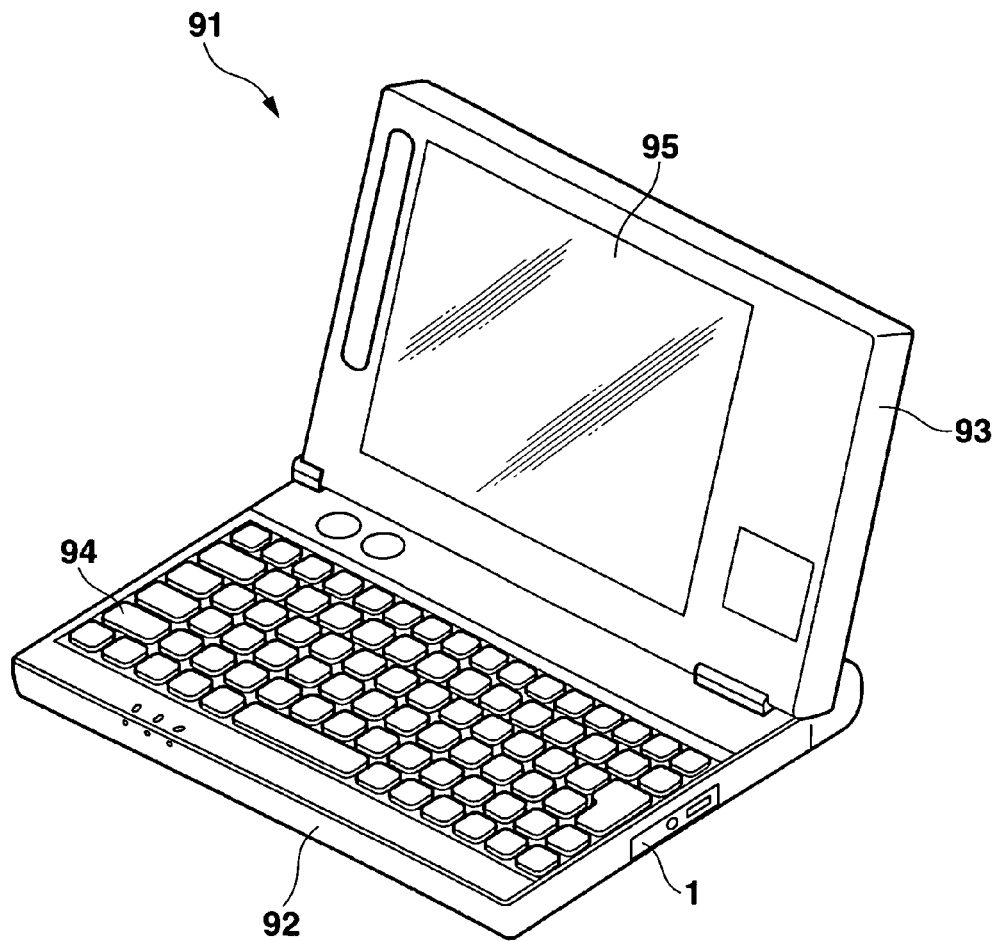
FIG. 8 is an overall perspective view of an electronic device in which the fuel container is mounted.

The fuel container 1 thus configured is mounted in an electronic device 91 containing a fuel cell and the others, as shown in FIG. 8. The residual amount of the liquid fuel in the fuel container 1 is measured by a fuel residual amount measurement device provided in the electronic device 91.

The electronic device 91 is, for example, a mobile electronic device, and more particularly, a notebook personal computer. The electronic device 91 has a built-in arithmetic processor circuit configured of a CPU, RAM, ROM, and other electronic components, and further includes a lower housing 92 provided with a keyboard 94, and an upper housing 93 provided with a liquid crystal display 95. The lower and the upper housings 92, 93 are hingedly coupled to one another, and are foldable in the state that the upper housing 93 is overlapped with the lower housing 92 so that the liquid crystal display 95 opposes the keyboard 94.

Figure 9:
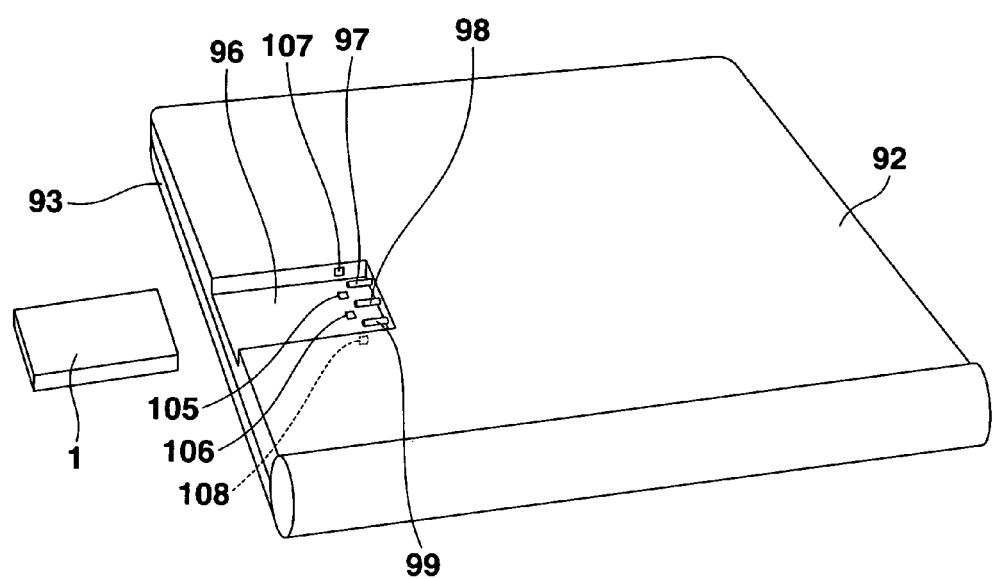
FIG. 9 is a perspective view of a part of the electronic device.

FIG. 9 is a perspective view of a bottom face and right side face of the electronic device 91. As shown in FIG. 9, an attaching portion 96 of a recessed shape, for fixedly attaching or loading the fuel container 1 is recessionally provided in a portion ranging from the right side face to bottom face of the lower housing 92. An air introduction pipe 97, a fuel introduction pipe 98, and a water introduction pipe 99 are protrudingly provided to a wall face on the right hand side of the recessed attaching portion 96. The air introduction pipe 97, fuel introduction pipe 98, and water introduction pipe 99, respectively, correspond to the air discharge port 53, fuel discharge port 62, and water discharge port 54 of the fuel container 1. The front face of the fuel container 1 is positioned leftward, and the fuel container 1 is then attached to slide leftwardly into the attaching portion 96. Thereby, the air introduction pipe 97, the fuel introduction pipe 98, and the water introduction pipe 99 are inserted into the air discharge port 53, the fuel discharge port 62, and the water discharge port 54, respectively. Resultantly, the air introduction pipe 97 is inserted into the check valve 41, the fuel introduction pipe 98 is inserted into the check valve 43, and the water introduction pipe 99 is inserted into the check valve 42. Thereby, the bodies of liquid fuel 11 to 14 in the container body 2 are supplied to the electronic device 91 through the fuel introduction pipe 98, and the water 31 in the pipe portion 24 is supplied to the electronic device 91 through the water introduction pipe 99. In addition, atmospheric air is drawn into the pipe portion 23 through the air filter 86, and is supplied to the electronic device 91 through the air introduction pipe.

As described above, the fuel discharge port 62, the air discharge port 53, and the water discharge port 54 are provided on the same face. Consequently, the fuel introduction pipe 98, the air introduction pipe 97, and the water introduction pipe 99 can be inserted through one-time simple attaching operation into the respective ports 62, 53, 54.

The fuel residual amount measurement device provided in the electronic device 91 will be described hereinbelow. The fuel residual amount measurement device includes first to fourth sensors 105 to 108 each forming of a light emitting device and a photo-sensor device. The sensors 105 to 108 are provided independently of the container body 2 outside of the container body 2. The sensors 105 to 108, respectively, are exposed on the wall face of the attaching portion 96 in the positions corresponding to front portions of the fuel storage spacings 25 to 28. The first sensor 105 detects that the follower auxiliary member 75 is positioned on a front end side of the fuel storage spacing 25. The second sensor 106 detects that the follower auxiliary member 76 is positioned on a front end side of the fuel storage spacing 26. The third sensor 107 detects that the follower auxiliary member 77 is positioned on a front end side of the fuel storage spacing 27. The fourth sensor 108 detects that the follower auxiliary member 78 is positioned on a front end side of the fuel storage spacing 28.

As the water 31 is supplied to the electronic device 91, the amount of the water 31 in the pipe portion 24 is reduced. In conjunction therewith, distortional stresses occur with the follow-up unit 32 to the extent that the viscosity coefficient of the follow-up unit 32 is reduced. In conjunction with consumption of the water 31, the follow-up unit 32 contacts the rear-end liquid faces of the follow-up unit 32, and follows the liquid face in that state.

As the bodies of liquid fuel 11 to 14 are supplied to the electronic device 91, the amounts of the bodies of liquid fuel 11 to 14 in the spacings 25 to 28 are reduced. In conjunction therewith, distortional stresses occur with the follower units 15 to 18 to the extent that the viscosity coefficients of the follower units 15 to 18 are reduced. In conjunction with consumption of the bodies of liquid fuel 11 to 14, the follower units 15 to 18 contact rear-end liquid faces of the bodies of liquid fuel 11 to 14, and follow the liquid faces. In addition, in conjunction with consumption of the bodies of liquid fuel 11 to 14, follower auxiliary members 75 to 78 follow the rear-end liquid faces of the bodies of liquid fuel 11 to 14 while the bodies of liquid fuel 11 to 14 and follower units 15 to 18 are being in contact with one another. Thus, the follower auxiliary members 75 to 78 are present between the follower units 15 to 18 and the bodies of liquid fuel 11 to 14. Accordingly, although the opening areas of the fuel storage spacings 25 to 28 are large, the follower units 15 to 18 follow the bodies of liquid fuel 11 to 14, thereby enabling it to maintain hermetic states of the bodies of liquid fuel 11 to 14.

As the amounts of the bodies of liquid fuel 11 to 14 and the water 31 are reduced, the volumes of spacings located rearward of the follower units 15 to 18 and 32 are increased. Nevertheless, however, in the configuration in which the check valve 83 is provided, the check valve 83 is open to supply air into those spacings, so that the spacings are normally maintained at substantially the atmosphere pressure. Unless the check valve 83 is provided, the spacings are directly maintained at the atmosphere pressure. In this case, also air and pressure can be applied using the pressure regulation opening 82.

The liquid fuel 11 to 14 flows to the recess portion 59 from the fuel storage spacings 25 to 28, in which streams of liquid fuel 11 to 14 are merged in the recess portion 59 and are supplied in a mixed state to the electronic device 91 from the fuel discharge port 62. Since the opening areas of the communication holes 55 to 58 are different from one another, also the reduction amounts of the liquid fuel 11 to 14 per unit time are different from one another. More specifically, the opening areas are larger in the order of the communication holes 58, 57, 56, and 55. Therefore, the residual amounts are reduced earlier in the order of the liquid fuel 14 in the fuel storage spacing 28, the liquid fuel 13 in the fuel storage spacing 27, the liquid fuel 12 in the fuel storage spacing 26, and the liquid fuel 11 in the fuel storage spacing 25.

Accordingly, among the follower auxiliary members 75 to 78, the follow-up auxiliary member 78 is earliest in being positioned on the front end side of the fuel storage spacing 28. The follow-up auxiliary member 77 is second earliest in being positioned on the front end side of the fuel storage spacing 27. The follow-up auxiliary member 76 is third earliest in being positioned on the front end side of the fuel storage spacing 26. The follow-up auxiliary member 75 is latest in being positioned on the front end side of the fuel storage spacing 25.

Accordingly, among the sensors 105 to 108, the fourth sensor 108 is earliest in detecting the follow-up auxiliary member 78. The third sensor 107 is second earliest in detecting the follow-up auxiliary member 77. The second sensor 106 is third earliest in detecting the follow-up auxiliary member 76. The first sensor 105 is latest in detecting the follow-up auxiliary member 75. Thereby, the entire residual amount of the liquid fuel in the fuel container 1 can be verified. More specifically, in the event that no one of the sensors 105 to 108 has detected the residual amount, it is possible to verify that the overall liquid fuel is sufficiently present in the fuel container 1. As the sensors 108, 107, and 106 detect the residual amounts in that order, it is possible to verify that the residual amount of the overall liquid fuel is eventually reduced. When the first sensor 105 has detected the residual amount, it is possible to verify that substantially no residual amount of the overall liquid fuel is present.

Preferably, the arithmetic processor circuit of the electronic device 91 functions to detect the residual amounts of the liquid fuel in response to detection signals of the sensors 105 to 108 and then to cause the liquid crystal display 95 to display the residual amounts. More specifically, the arithmetic processor circuit of the electronic device 91 functions in the manner that when no detection signal has been input from any one of the sensors 105 to 108, the liquid crystal display 95 displays that the liquid fuel is in a full state. When a detection signal has been input from the sensor 108, the liquid crystal display 95 displays that the residual amount of the liquid fuel is three fourths with respect to the full amount thereof. When a detection signal has been input from the sensor 107, the liquid crystal display 95 displays that the residual amount of the liquid fuel is half the full amount thereof. When a detection signal has been input from the sensor 106, the liquid crystal display 95 displays that the residual amount of the liquid fuel is one fourth with respect to the full amount thereof. When a detection signal has been input from the sensor 105, the liquid crystal display 95 displays that the liquid fuel has been depleted.

In the event that the bodies of liquid fuel 11 to 14 have been depleted, it is sufficient to detach the fuel container 1 from the electronic device 91 and to attach a new fuel container 1 to the electronic device 91. Since the sensors 105 to 108 mounted in the electronic device 91, the residual amounts of the bodies of liquid fuel 11 to 14 in the fuel container 1 can be measured even after replacement with the new fuel container 1. Thus, since no sensors are provided, the fuel container 1 is manufacturable at low costs. Further, if the used-up fuel container 1 is carefully filled with the bodies of liquid fuel 11 to 14, the fuel container 1 is reusable.

As described above, as the residual amount of the overall liquid fuel is reduced, the positions of the follower auxiliary members 75 to 78 are differentiated in the fuel storage spacings 25 to 28, and the positions are detected by the sensors 105 to 108. As such, residual amount information of the overall liquid fuel can be verified at multiple stages, so that an operable period of time of the electronic device 91 and a replacement timing of the fuel container 1, for example, can be predicted. Consequently, a case does now occur in which the residual amount of the overall liquid fuel is suddenly depleted to thereby cause the electronic device 91 to be inoperable.

As the fuel container 1 is used, the air filter 86 is eventually contaminated or clogged. However, since the air filter 86 is mounted in the fuel container 1, also the air filter 86 can be replaced with a new one together with replacement of the fuel container 1. For this reason, the air filter 86 does not have to be specifically checked.

Figures 10A, 10B:
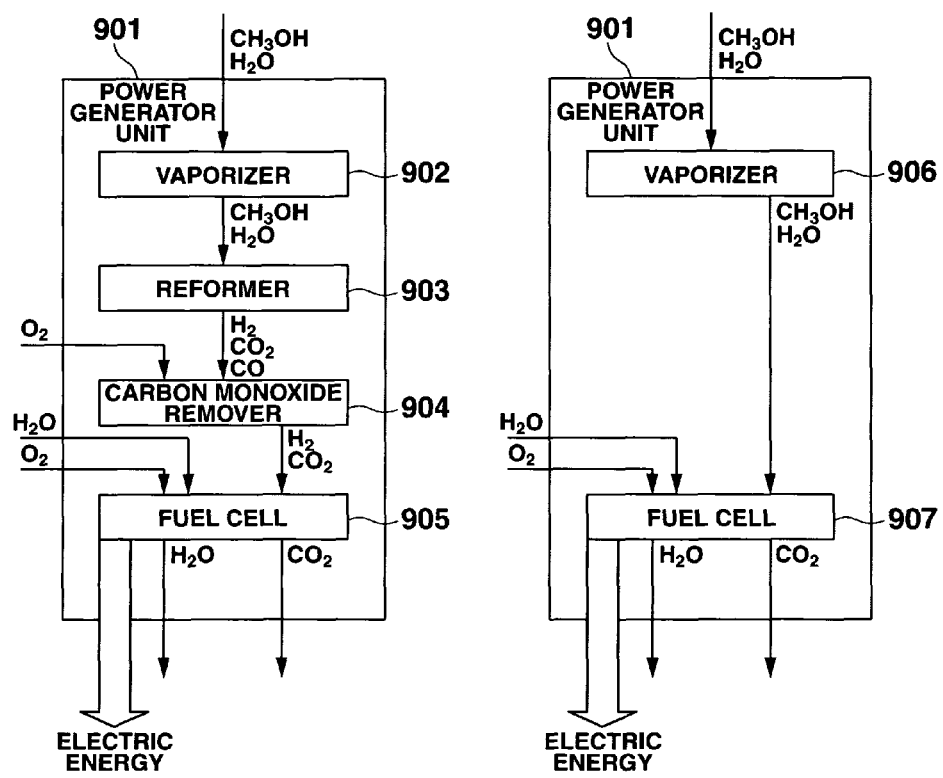
FIGS. 10A and 10B, respectively, are block diagrams of power generator units different from each other.

The electronic device 91 contains any one of power generator units 901 shown in FIGS. 10A and 10B. The power generator units 901 generate power by using the liquid fuel 11 to 14 in the fuel container 1, and are configured as shown in FIGS. 10A and 10B. In either one of the cases of FIGS. 10A and 10B, methanol is exemplified for the bodies of liquid fuel 11 to 14.

In the case shown in FIG. 10A, the power generator unit 901 is configured to include a vaporizer 902, a reformer 903, a carbon monoxide remover 904, and a fuel cell 905.

The bodies of liquid fuel 11 to 14 and the water 31 are supplied to the power generator unit 901, and are mixed therein. A liquid mixture of the liquid fuel 11 to 14 and the water 31 is first supplied to the vaporizer 902. In the vaporizer 902, the supplied liquid mixture is vaporized into a gas mixture of the fuel and the water. The gas mixture thus generated in the vaporizer 902 is supplied to the reformer 903.

In the reformer 903, hydrogen and carbon dioxide are generated from the gas mixture supplied from the vaporizer 902. In more specific, as expressed in chemical formula (1), the gas mixture is reacted through catalyst, thereby to generate carbon dioxide and hydrogen.

$$CH_3OH + H_2O \rightarrow 3H_2 + CO_2 \qquad (1)$$

In the reformer 903, a case can occur in which methanol and water vapor are not completely reformed into carbon dioxide and hydrogen. In this case, as in chemical formula (2), the methanol and the water vapor react with each other, thereby to generate carbon dioxide and carbon monoxide.

$$2CH_3OH + H_2O \rightarrow 5H_2 + CO + CO_2 \qquad (2)$$

The gas mixture, which has been generated in the reformer 903, is supplied to the carbon monoxide remover 904.

In the carbon monoxide remover 904, the carbon monoxide contained in the gas mixture, which has been supplied from the reformer 903, is selectively oxidized, whereby the carbon monoxide is removed from the gas mixture. More specifically, the carbon monoxide is reacted with oxygen in air through catalyst to thereby generate carbon dioxide, in which the carbon monoxide has been specifically selected from the gas mixture supplied from the reformer 903, and the air has been supplied by a pump from the air discharge port 53 of the fuel container 1.

$$2CO + O_2 \rightarrow 2CO_2 \qquad (3)$$

The gas mixture is then supplied from the carbon monoxide remover 904 to a fuel electrode of the fuel cell 905.

At the fuel electrode of the fuel cell 905, as expressed in electrochemical formula (4) given below, hydrogen gas of the gas mixture, which has been supplied from the carbon monoxide remover 904, is dissolved into hydrogen ions and electrons through the action of the catalyst of the fuel electrode. The hydrogen ions are conducted to an air electrode through an electrolyte film, such as a solid polymer electrolyte film, of the fuel cell 905, and electrons are taken out by the fuel electrode. As for the electrolyte film of the fuel cell 905, before the hydrogen gas supplied from the carbon monoxide remover 904 reaches the fuel cell 905, the electrolyte film of the fuel cell 905 is preliminarily humidified by the water 31 stored in the pipe portion 24 of the fuel container 1. Accordingly, the hydrogen ions being generated during power generation is dehydrated with water contained in the electrolyte, whereby ion conductivity of the electrolyte film can be improved. Consequently, when the hydrogen gas has reached the fuel cell 905, the electrolyte film is improved in the conductivity for the hydrogen ions generated from the hydrogen gas.

$$3H_2 \rightarrow 6H^+ + 6e^- \qquad (4)$$

The air is supplied by the pump from the air discharge port 53 of the fuel container 1 to the air electrode of the fuel cell 905. Then, as represented in electrochemical formula (5) given below, reaction takes place among the oxygen in the air, the hydrogen ions passed through the solid polymer electrolyte film, and the electrons, thereby to generate water as a bi-product.

$$6H^+ + 3/2O_2 + 6e^- \rightarrow 3H_2O \qquad (5)$$

As described above, electric energy is generated in the fuel cell 905 through the electrochemical reactions represented by the formulas (4) and (5). A gas mixture of the generated products, such as the water, carbon dioxide, and air, is discharged to the outside.

In the case shown in FIG. 10B, the power generator unit 901 is configured to include a vaporizer 906 and a fuel cell 907.

The bodies of liquid fuel 11 to 14 and the water 31 are supplied to the power generator unit 901, and are mixed therein. A liquid mixture thereof is vaporized in the vaporizer 906 into a gas mixture of the methanol and water vapor. The gas mixture thus generated in the vaporizer 906 is supplied to a fuel electrode of a fuel cell 907.

At the fuel electrode of the fuel cell 907, as expressed in electrochemical formula (6) given below, the gas mixture, which has been supplied from the vaporizer 906, is dissolved into hydrogen ions, electrons, and carbon dioxide through the action of the catalyst of the fuel electrode. The hydrogen ions are conducted to an air electrode through a solid polymer electrolyte film, and electrons are taken out by the fuel electrode. As for the electrolyte film of the fuel cell 907, before any one of the bodies of liquid fuel 12 to 14 supplied from the fuel container 1 reaches the fuel cell 907, the electrolyte film of the fuel cell 907 is preliminarily humidified by the water 31 stored in the pipe portion 24 of the fuel container 1. Accordingly, the hydrogen ions being generated during power generation is dehydrated with water contained in the electrolyte, whereby ion conductivity of the electrolyte film can be improved. Consequently, when any one of the bodies of liquid fuel 12 to 14 has reached the fuel cell 907, the electrolyte film is improved in the conductivity for the hydrogen ions.

$$CH_3OH + H_2O \rightarrow CO_2 + 6H^+ + 6e^- \quad (6)$$

The air is supplied by the pump from the air discharge port 53 of the fuel container 1 to the air electrode of the fuel cell 907. Then, as represented in electrochemical formula (7) given below, reaction takes place among the oxygen in the air, the hydrogen ions passed through the solid polymer electrolyte film, and the electrons taken out by the fuel electrode, thereby to generate water.

$$6H^+ + 3/2O_2 + 6e^- \rightarrow 3H_2O \quad (7)$$

As described above, electric energy is generated through the electrochemical reactions represented by the formulas (6) and (7). A gas mixture of the generated products, such as the water, carbon dioxide, and air, is discharged to the outside.

The water 31 stored in the fuel container 1 is used in the initial operation of the power generator unit 901. When the water 31 in the fuel container 1 is depleted, the water generated by the fuel cell 905, 907 is supplied to the vaporizer 902, 906.

In the case where the power generator unit 901 is provided in the electronic device 91, the fuel container 1 is attachable to and detachable from the electronic device 91. The electronic device 91 is operated by the electric energy generated in the power generator unit 901.

The present invention is not limited to the embodiment described above, but may be improved and design-changed in various ways without departing from the spirit and scope of the invention.

For example, although the storage spacing for the liquid fuel is separated into the four fuel storage spacings 25 to 28 in the container body 2, the spacing may be separated into two, or three, or five or more. In addition, the configuration may be such that the volumes of the fuel storage spacings 25 to 28 are different from one another, and the positions of the follower auxiliary members 75 to 78 are differentiated from one another as the residual amounts of the liquid fuel are reduced, whereby the residual amount are measured at multiple stages.

In addition, although the opening areas of the communication holes 55 to 58 are all different from one another, selected ones of the communication holes may have the same opening area. More specifically, no problems occur as long as at least one of the communication holes 55 to 58 is different in the opening area from the others.

Although, in the fuel storage spacings 25 to 28 and the communication holes 55 to 58, one communication hole is in communication in units of one spacing, a plurality of communication holes may be in communication in units of one spacing. In the case where the plurality of communication holes are in communication, the total opening area of the plurality of communication holes is taken into account.

Further, in order to facilitate the detection of the sensors, only the sidewall of the respective follower auxiliary member may be different in color or optical reflectance from the liquid fuel.

Figure 11:
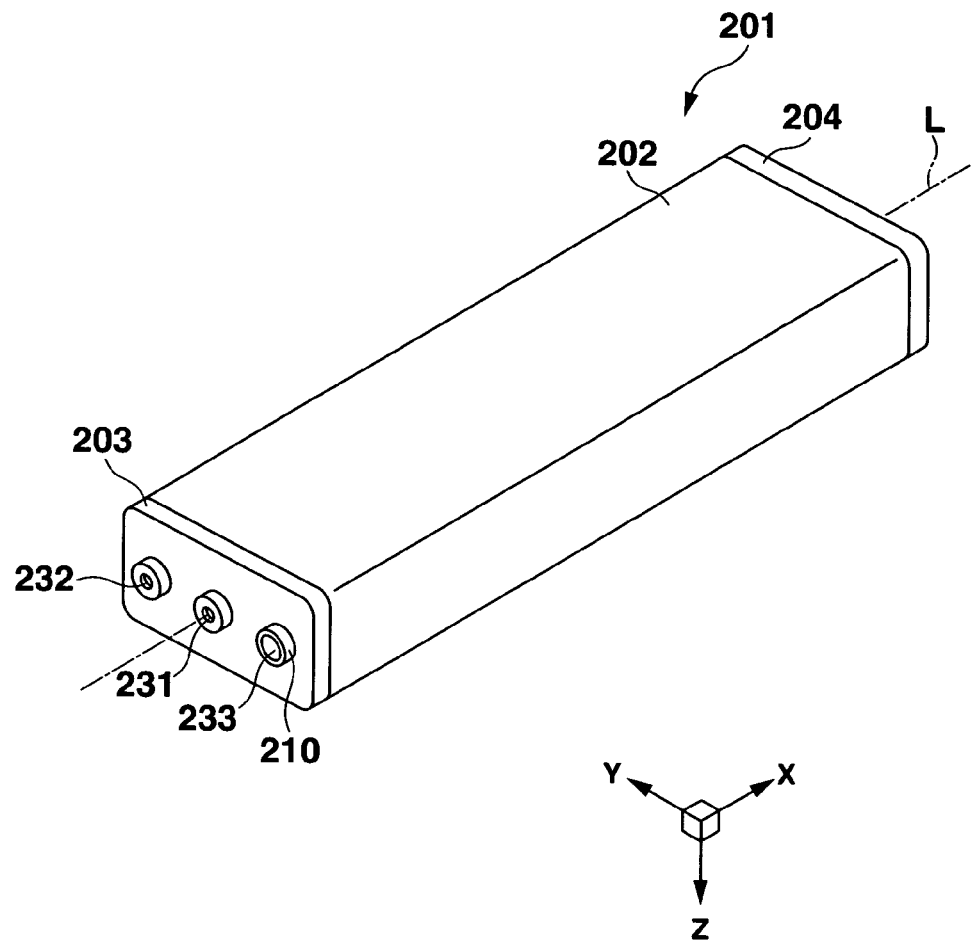
FIG. 11 is a perspective view of a fuel container.
Figure 12:
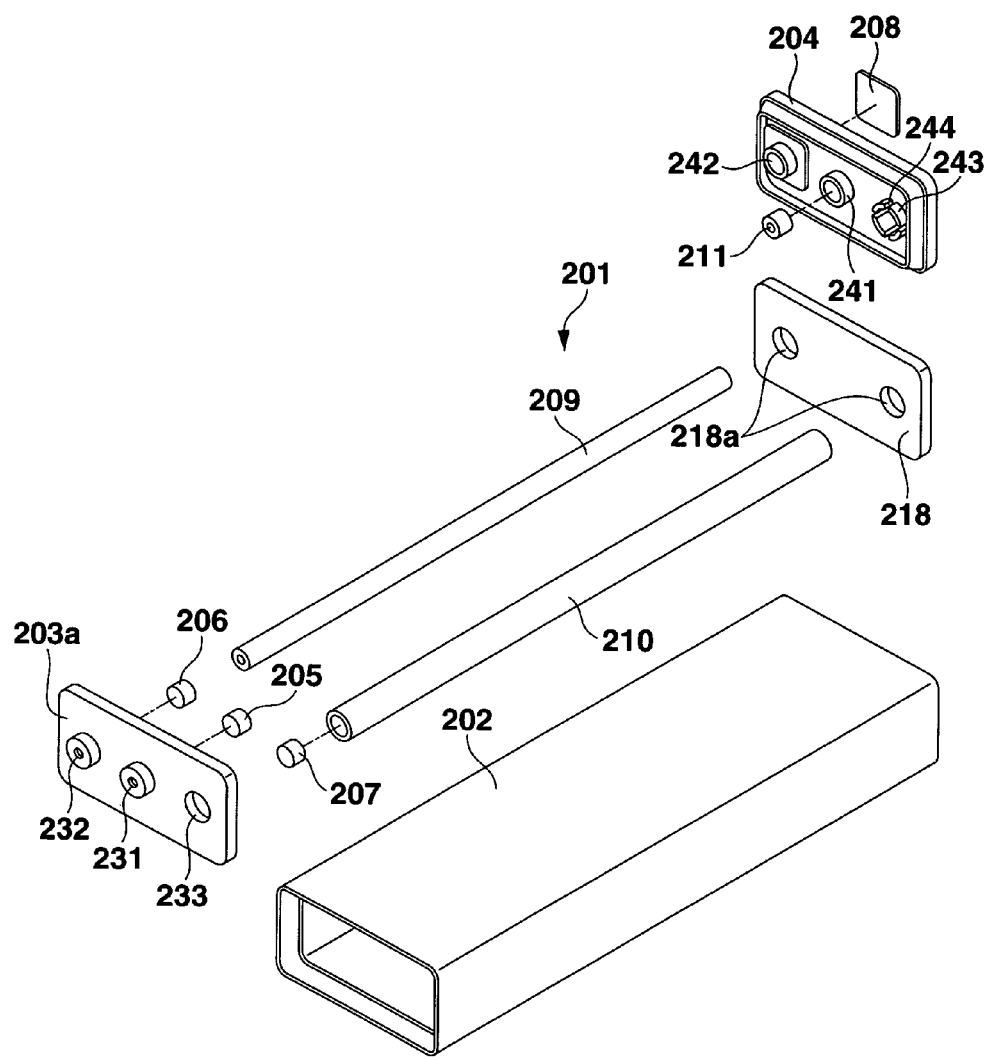
FIG. 12 is an exploded perspective view of the fuel container.
Figure 13:
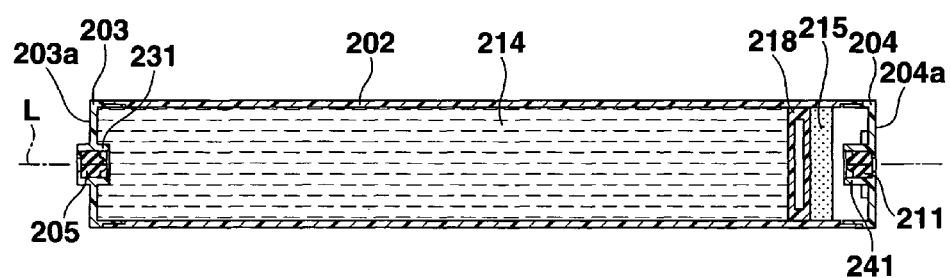
FIG. 13 is an elevational cross sectional view of the fuel container, taken along a centerline L.
Figure 14:
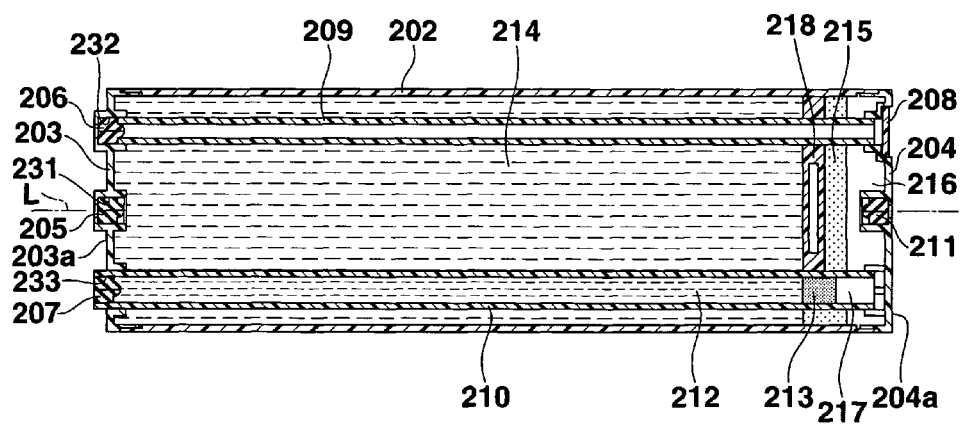
FIG. 14 is a horizontal cross sectional view of the fuel container, taken along a centerline L.

FIG. 11 is a perspective view of a fuel container 201 provided in a fuel residual amount measurement device according to an embodiment to which the present invention is adapted. FIG. 12 is an exploded perspective view of the fuel container 201. FIG. 13 is an end elevational view of a cross section as viewed in a width direction Y of the fuel container 201, in which the cross section passes along a centerline L extending along a longitudinal direction X of the fuel container 201 and is parallel to a thickness direction Z. FIG. 14 is an end elevational view of a cross section as viewed in the thickness direction Z of the fuel container 201, in which the cross section passes along the centerline L extending along the longitudinal direction X of the fuel container 201 and is parallel to the width direction Y.

The fuel residual amount measurement device according to the invention is capable of detecting the residual amount of liquid fuel 214 in the fuel container 201 even when the liquid fuel 214 contained in the fuel container 201 is supplied to the fuel cell. To begin with, the configuration of the fuel container 201 provided in the fuel residual amount measurement device will be described herebelow.

As shown in FIGS. 11 to 14, the fuel container 201 has a substantially parallelepiped container body 202, in which various components and members are mounted to and in the container body 202. The container body 202 is formed into the shape like a rectangular pipe of which inside is hollow, in which front and rear ends of the container body 202 are open. As the container body 202 is viewed in the longitudinal direction X, the container body 202 is formed into a shape like a rectangular frame.

The container body 202 is formed using a substantially transparent member. Preferably, the container body 202 exhibits transmission characteristics for light of high sensitivity zones of photodiodes 300b of sensors 300, described further below, being used as optical sensor means, and has transmission characteristics for visible light, for example. In consideration of gas impermeability and cost reduction in manufacture and assembly and manufacturability, it is preferably formed of a single-layer structure or multilayer structure with two or more layers, including at least one or more resins of, for example, polypropylene, polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride. As long as at least one layer of the structure is formed of a resin having high gas shielding characteristics in the case of a multilayer structure, no problems occur during practical use even in the case where other layers have not high gas shielding characteristics. In addition, materials usable for sites in which transmission characteristics are not specifically required include synthetic resin and glass chromatic or having low optical transmission characteristics, for example.

An air pipe 209 and a water storage pipe 210 are provided in the container body 202. Both pipes 209, pipe 210 extend along the longitudinal direction X of the container body 202.

A front lid member 203 is inserted into the front end opening of the container body 202. Thus, the front end opening of the container body 202 is closed by the front lid member 203. A rear lid member 204 is fitted into the rear end opening of the container body 202. Thus, the rear end opening of the container body 202 is closed by the rear lid member 204, in which a spacing 216 is formed by being partitioned by the container body 202 and the lid member 4.

A plurality of discharge ports, namely, a fuel discharge port 231, an air discharge port 232, and a water discharge port 233, which are connected to a fuel cell body, are formed in a front outer face 203a of the front lid member 203. The fuel discharge port 231 is formed in a central portion of the front lid member 203. The water discharge port 233, the fuel discharge port 231, and the air discharge port 232 are linearly arranged in that order along the width direction Y of the fuel container 201.

Figure 16:
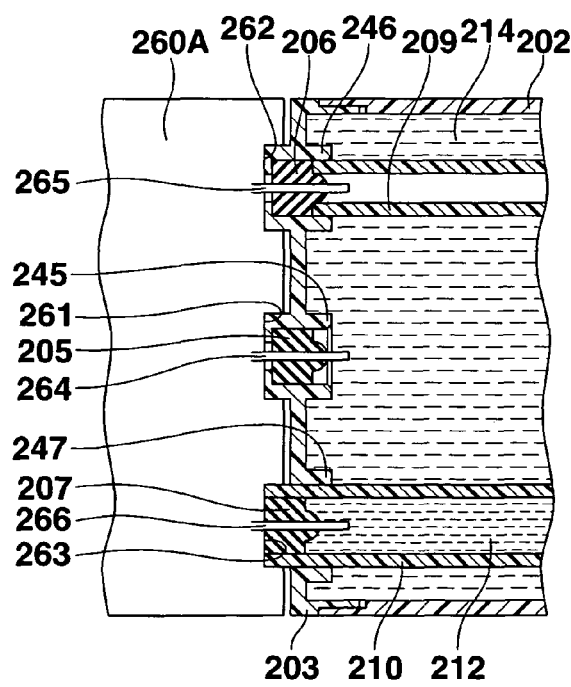
FIG. 16 is a schematic view of a connection structure connecting between the fuel container and the electronic device.

The fuel discharge port 231 and the air discharge port 232 are formed to through-formed to the front outer face 203a from a rear internal face of the front lid member 203. Respective peripheries of the fuel and air discharge ports 231, 232, which configure the outer face 203a of the front lid member 203, are protrudingly provided into nipple shapes. Similarly, the water discharge port 233 is through-formed to the front outer face 203a from the internal face of the front lid member 203, but the periphery of the water discharge port 233 is provided flat. As shown in FIG. 16, an accommodation portion 245 for accommodating a below-described check valve 205 is provided in a site corresponding to the fuel discharge port 231 in the rear internal face of the front lid member 203. An accommodation portion 246 for accommodating a below-described check valve 206 and for holding a lead end of the air pipe 209 is provided in a site corresponding to the air discharge port 232 in the rear internal face of the front lid member 203. A holding portion 247 for holding a front end portion of the water storage pipe 210 is provided in a site corresponding to the air discharge port 233 in the rear internal face of the front lid member 203.

The check valve 205 that prevents the flow of fluid unnecessarily directed to the outside of the container body 202 through the fuel discharge port 231 from the interior of the container body 202 is inserted into the accommodation portion 245 in the fuel discharge port 231. More specifically, the check valve 205 is a duckbill valve formed into a duckbill shape. The check valve 205 is inserted into the fuel discharge port 231 in the state that a duckbill-shaped end is directed toward the inside of the container body 202. In the check valve 205, an insertion opening communicating between the inside and outside of the container body 202 may be preliminarily provided in the event of insertion of a below-describe fuel introduction pipe 264 (shown in FIG. 16). Alternatively, the structure may be such that an insertion opening is formed for the first time by insertion of the fuel introduction pipe 264. When pressure is exerted in the interior of the container body 202 in the case where the insertion opening is preliminarily provided, forces are exerted around the insertion opening in the direction of closing the insertion opening. This prevents the fluid from unnecessarily leaking from the insertion opening to the outside of the container body 202.

The check valve 206 that prevents the flow of fluid unnecessarily directed to the outside of the container body 202 through the air discharge port 232 from the interior of the container body 202 is inserted into the accommodation portion 246 in the fuel discharge port 232. More specifically, the check valve 206 is a duckbill valve formed into a duckbill shape. The check valve 206 is inserted into the water discharge port 233 in the state that a duckbill-shaped end is directed toward the inside of the container body 202. In the check valve 205, an insertion opening communicating between the inside and outside of the container body 202 may be preliminarily provided in the event of insertion of a below-describe air introduction pipe 265 (shown in FIG. 16). Alternatively, the structure may be such that an insertion opening is formed for the first time by insertion of the air introduction pipe 265. When pressure is exerted in the interior of the container body 202 in the case where the insertion opening is preliminarily provided, forces are exerted around the insertion opening in the direction of closing the insertion opening. This prevents the fluid from unnecessarily leaking from the insertion opening to the outside of the container body 202.

A pressure regulation opening 241 and an air introduction opening 242 are formed in the rear lid member 204. The pressure regulation opening 241 is formed in a position corresponding to the fuel discharge port 231. The air introduction opening 242 is formed in a position corresponding to the air discharge port 232.

Figure 15:
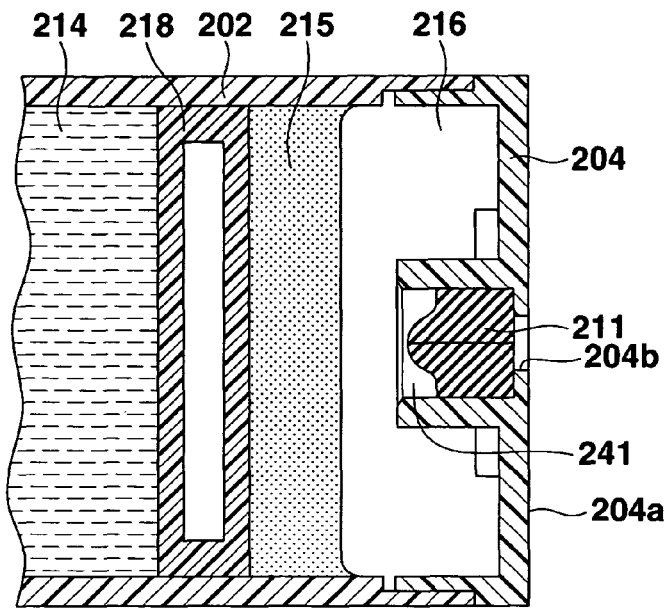
FIG. 15 is an enlarged cross sectional view of a rear lid member of the fuel container.

The pressure regulation opening 241 extends to an outer face 204a from the inner face of the rear lid member 204. As shown in FIGS. 13 and 15, a check valve 211 that prevents the flow of fluid directed to the outside of the container body 202 through the pressure regulation opening 241 from the interior of the container body 202 is inserted into the pressure regulation opening 241. More specifically, the check valve 211 is a duckbill valve formed into a duckbill shape. The check valve 211 is inserted into the pressure regulation opening 241 in the state that a duckbill-shaped end is directed toward the inside of the container body 202. FIG. 15 is an enlarged cross sectional view of the rear lid member 204 side taken along the same cross section as in FIG. 13. In the check valve 211, an insertion opening communicating between the inside and outside of the container body 202 is preliminarily provided. The insertion opening is provided in the rear lid member 204 to be in communication to a discharge opening 204b opened in the thickness direction. With the check valve 211, even when pressure is exerted in the interior of the container body 202, forces are exerted around the insertion opening in the direction of closing the insertion opening. This prevents the fluid from unnecessarily leaking from the insertion opening to the outside of the container body 202. On the contrary, it is set such that air enters from the outside of the container body 202 in correspondence to a negative pressure occurring as the amount of the liquid fuel 214 stored in the container body 202 is reduced therein, so that the pressure difference between the inside and outside of the container body 202 is reduced.

As shown in FIGS. 12 and 14, the air introduction opening 242 extends from the inner face to the outer face of the rear lid member 204. A periphery of the air introduction opening 242 is recessionally provided on the outer face of the rear lid member 204. An air filter 208 is inserted into the recessionally provided portion. With the air filter 208 thus provided, air is permitted to enter the interior of the below-described air pipe 209 from the outside of the container body 202. Additionally, the air introduction opening 242 is closed to not permit dusts to enter the interior of the air pipe 209 from the outside of the container body 202.

A rear end portion of the air pipe 209 is inserted into the air introduction opening 242. A front end portion of the air pipe 209 is inserted into the accommodation portion 246 in the air discharge port 232. The air pipe 209 is interposed between the front lid member 203 and the rear lid member 204. The air filter 208 is provided rearward of the rear end portion of the air pipe 209, and the check valve 206 is provided forward of the front end portion of the air pipe 209. The air pipe 209 extends through a below-described solid follower auxiliary member 218 not having liquidity.

As shown in FIGS. 11, 12, 14 and 16, a front end of the water storage pipe 210 is inserted into the water discharge port 233 of the front lid member 203 to pass therethrough. The water storage pipe 210 is held by the holding portion 247 in such a manner that the front end portion thereof protrudes outwardly of the outer face of the front lid member 203. A holding portion 243 is formed in a position corresponding to the water discharge port 233 on the inner face of the rear lid member 204. The rear end portion of the water storage pipe 210 is mounted to be held by the holding portion 243. Thereby, the water storage pipe 210 is interposed between the front lid member 203 and the rear lid member 204. In the holding portion 243 provided on the inner face of the rear lid member 204, four clearances or slits 244 are formed in portions coupling with the rear end face of the water storage pipe 210. Since a spacing 217 on the side of the rear end face of the water storage pipe 210 and the spacing 216 are connected in communication with each other, the rear end portion opening of the water storage pipe 210 is not closed.

As shown in FIGS. 12 and 14, a check valve 207 that prevents the flow of fluid directed from the interior of the water storage pipe 210 to the end portion opening thereof is inserted into a portion close to the front end portion in the water storage pipe 210 on the side of the water discharge port 233. More specifically, the check valve 207 is a duckbill valve formed into a duckbill shape. The check valve 207 is positioned in the water storage pipe 210 in the state that a duckbill-shaped end is directed toward the rear lid member 204. In the check valve 207, an insertion opening communicating between the inside and outside of the container body 202 may be preliminarily provided in the event of insertion of a below-describe water introduction pipe 266 (shown in FIG. 16). Alternatively, the structure may be such that an insertion opening is formed for the first time by insertion of the water introduction pipe 266. In the case where the insertion opening is preliminarily provided, forces are exerted around the insertion opening in the direction of closing the insertion opening when pressure is exerted in the interior of the container body 202. This prevents the fluid from unnecessarily leaking from the insertion opening to the outside of the container body 202.

The check valves 205, 206, 207, and 211 are preferably of a deterioration-resistant material having neither reactivity nor solubility but having flexibility and elasticity. Usable materials therefor include synthetic resins such as polyvinyl alcohol, ethylene-vinyl alcohol copolymer resin, polyacrylonitrile, nylon, cellophane, polyethylene terephthalate, polycarbonate, polystyrene, polyvinylidene chloride, and polyvinyl chloride; and rubber or elastomers such as natural rubber, isoprene rubber, butadiene rubber, 1,2-butadiene rubber, styrene butadiene rubber, chloroprene rubber, nitrile rubber, butyl rubber, ethylene propylene rubber, chlorosulfonated polyethylene, acryl rubber, epichlorohydrin rubber, polysulfide rubber, silicone rubber, fluorine rubber, and urethan rubber.

The air pipe 209 and the water storage pipe 210 shown in FIG. 12, extend through the non-liquidity solid follower auxiliary member 218. The follower auxiliary member 218 is a hollow-plate shaped test unit, and has two through holes 218a formed on its left and right sides for insertion of the air pipe 209 and the water storage pipe 210. The through holes 218a as viewed in the longitudinal direction X are designed to have shapes similar to the air pipe 209 and the water storage pipe 210 and to be larger than the pipes. The follower auxiliary member 218 is guided by the air pipe 209 and the water storage pipe 210 to be movable along the longitudinal direction X. In the state viewed in the longitudinal direction X, the outer peripheral shape of the follower auxiliary member 218 is similar to the inner peripheral shape of the container body 202, and the through holes 218a are positioned in the container body 202. As viewed in the longitudinal direction X, the area of the follower auxiliary member 218 is preferably 50% or more, and more preferably 80 to 95% with respect to the opening area of the container body 202.

Preferably, at least a part of the follower auxiliary member 218 is chromatic or colored in a white base color to sufficiently reflect light of high sensitivity zones of the below-described photodiodes 300b being used as photo-sensor devices, such as visible light, for example. Examples thereof include those configured from, but not limited to, polypropylene, ethylene-vinyl alcohol copolymer resin, polyacrylonitrile, nylon, polyethylene terephthalate, polycarbonate, polystyrene, polyvinylidene chloride, polyvinyl chloride, and various rubber materials. Of course, if the light of the photo-sensor devices in high sensitivity zones is in red wavelength zones, it is preferably colored in red. Alternatively, a material exhibiting metallic luster may be coated on the surface of the follower auxiliary member 218 to improve the reflectance.

Alternatively, it may be set such that a fluorescent material emitting light of the photo-sensor devices in high sensitivity zones is applied to the follower auxiliary member 218, whereby the below-described light emitting devices emit light in wavelength zones that excite the fluorescent material.

In the interior spacing of the container body 202, the liquid fuel 214 is stored in a region frontward of the follower auxiliary member 218. In the interior spacing of the container body 202, a follower unit 215 including al least one of liquid, sol, or gel having low affinity for the liquid fuel 214 is stored in a region rearward of the follower auxiliary member 218. Since the follower unit 215 is interposed in a clearance between the follower auxiliary member 218 and the rear end of the container body 202, the region frontward of the follower unit 215 and the follower auxiliary member 218 in the interior spacing of the container body 202 is separated by the follower unit 215 and the follower auxiliary member 218 to be closed. The liquid fuel 214 is sealed to not leak to the forward region.

Water 212 is stored in the water storage pipe 210. A follower unit 213 composed of liquid, sol, or gel is stored in a region rearward of the body of water 212 in the water storage pipe 210, in which the water storage pipe 210 is closed by the follower unit 213. A region frontward of the follower unit 213 is filled with the water 212, in which the body of water 212 and the follower unit 213 are in contact with each other, and the water 212 is sealed by the follower unit 213. In the water storage pipe 210, the spacing 217 located rearward of the follower unit 213 is communicated to the spacing 216 located rearward of the container body 202.

In conjunction with the movement of the rear end interface of the liquid fuel 214 in association with consumption of the liquid fuel 214, the follower unit 215 moves in such a manner as to be attracted by the liquid fuel 214 in the state of the follower unit 215 being in contact with the liquid fuel 214. Thereby, the liquid fuel 214 is prevented from leaking and evaporating, and air is prevented from flowing into the liquid fuel 214. Similarly, in conjunction with the movement of the rear end interface of the liquid fuel 214 in association with consumption of the liquid fuel 214, the follower unit 213 moves in such a manner as to be attracted by the water 212 in the state of the follower unit 213 being in contact with the water 212. Thereby, the water 212 is prevented from leaking and evaporating, and air is prevented from flowing into the water 212.

The follower unit 215 is low in affinity with respect to the liquid fuel 214, and is neither dissolved nor diffused in the liquid fuel 214, and more preferably, is lower in surface energy than the liquid fuel 214. The follower unit 213 has affinity lower than the water 212, and is neither dissolved nor diffused in the water 212, and more preferably, has lower surface energy than the affinity than the water 212.

The follower units 213 and 215 each have the characteristics of structural viscosity fluid (anomalous viscosity fluid) in which nominal stress decreases as distortional stress (or, distortional velocity) increases.

Usable materials of the follower units 213 and 215 include polyglycol, polyester, polybuten, liquid paraffin, spindle oil, and other mineral oils; dimethyl silicone oil, methylphenyl silicone oil, and other silicone oils; aliphatic metal soap, denatured clay, silica gel, carbon black, natural rubber, synthetic rubber, and other synthetic polymers; and combinations thereof. Alternatively, viscosity-improved materials by adding solvent to the aforementioned materials may be used as the follower units 213 and 215.

Fuel containers 201 thus configured can be coated in batch with a different material when being packed for ex-work delivery, so that productivity is high.

Figure 17:
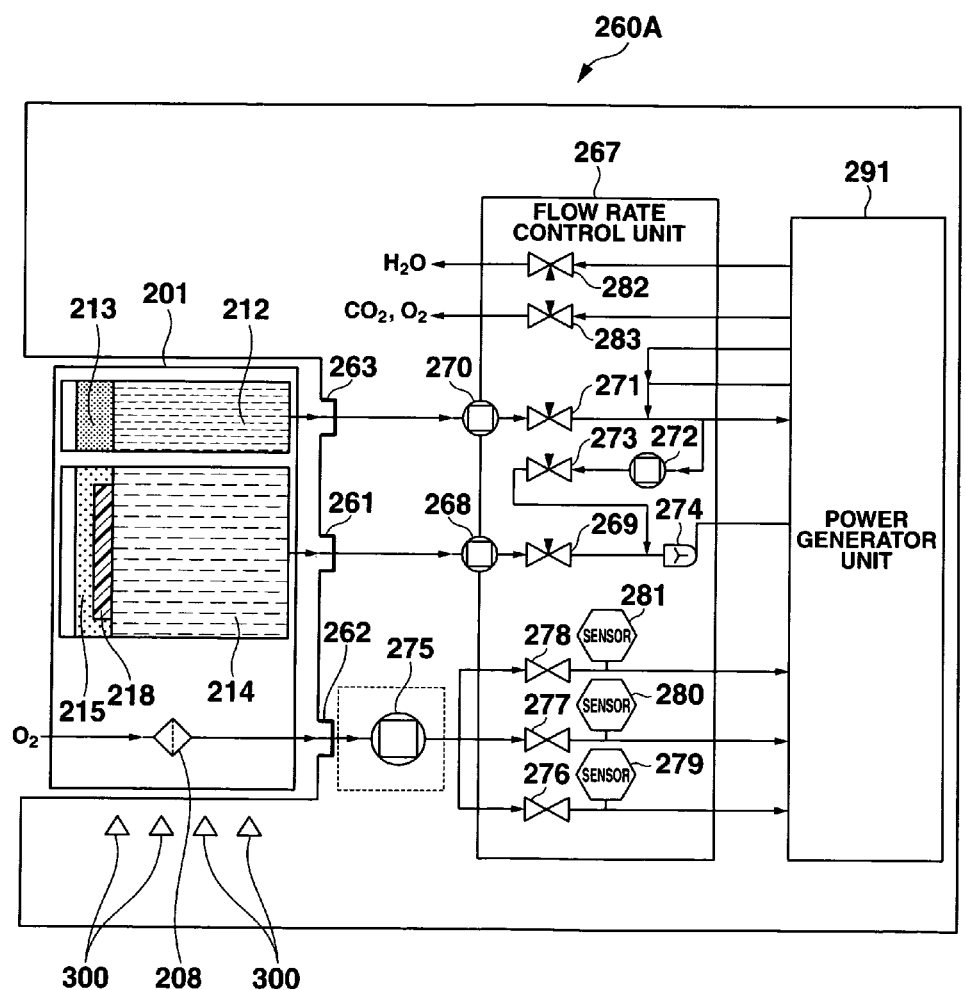
FIG. 17 is a block diagram showing a fluid control unit, a power generator unit, and the fuel container.
Figure 18:
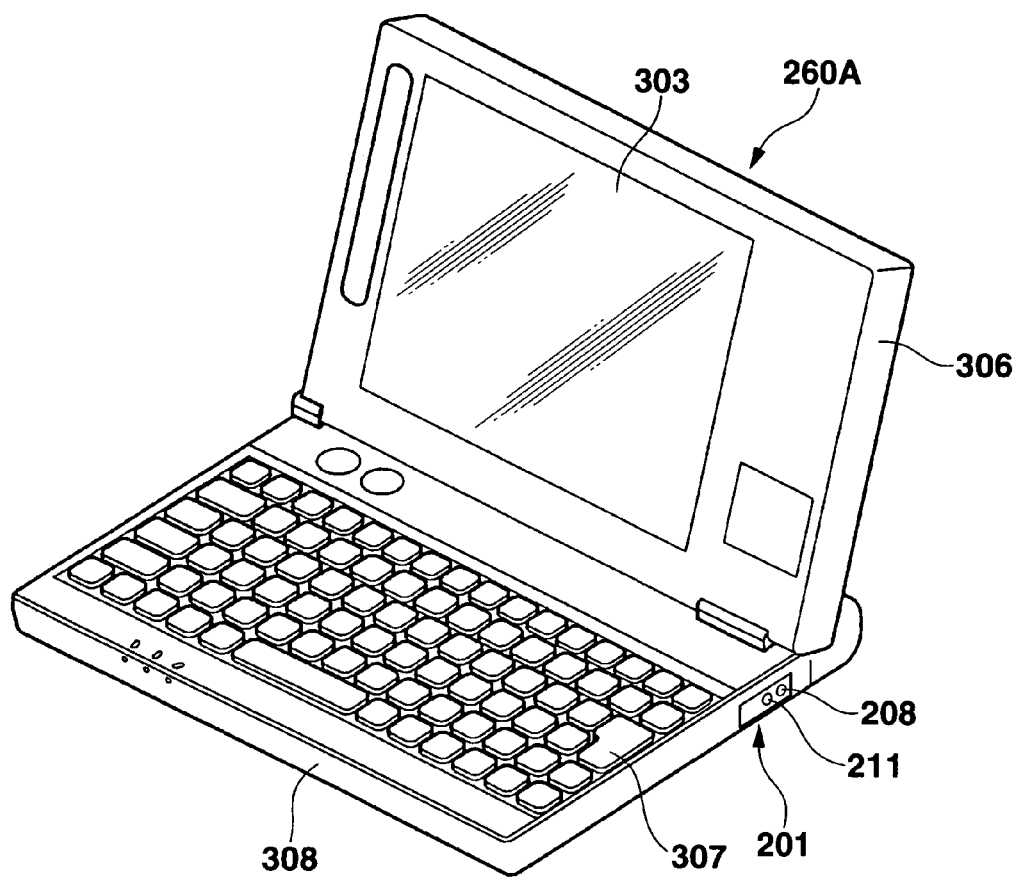
FIG. 18 is a general perspective view of a notebook personal computer.
Figure 19:
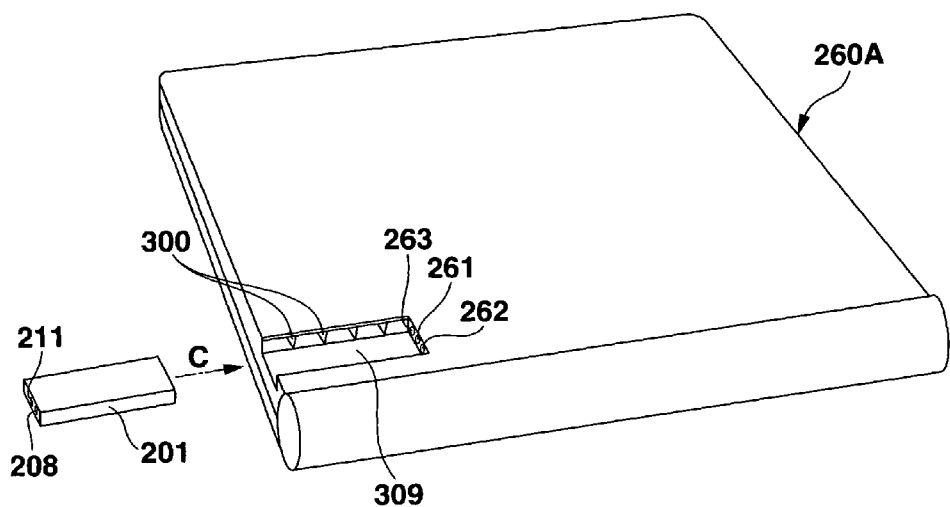
FIG. 19 is a general perspective view of the fuel container and notebook personal computer.

The fuel container 201 thus configured is mounted in an electronic device 260A containing a fuel cell and others, as shown in FIGS. 17 to 19. The residual amount of the liquid fuel in the fuel container 201 is measured by a fuel residual amount measurement device provided in the electronic device 260A.

The electronic device 260A is a mobile electronic device, and more particularly, a notebook personal computer. The electronic device 260A has a first housing 306 including a display section 303, and a second housing 308 including an input section 307. The first and second housings 306, 308 are coupled together in a hinged structure.

A storage section 309 allowing the fuel container 201 to be storable is provided in the second housing 308, as shown in FIG. 19. In the storage section 309, there are exposed mounting grooves 261 to 263 respectively corresponding to the fuel discharge port 231, air discharge port 232, and water discharge port 233 of the fuel container 201. A fuel introduction pipe 264, an air introduction pipe 265, and a water introduction pipe 266 are protrudingly provided to the mounting grooves 261, 262 and 263, as shown in FIG. 16.

The display section 303 is configured of, for example, a backlight liquid crystal (LC) panel or an EL display panel, in which screen display is performed in accordance with electric signals output from a controller section, and character information and/or images are thereby displayed.

The input section 307 has various buttons, such as functions keys, ten keys, and character input keys. When a button protruding out of the second housing 308 is pushed, the button is resiliently deformed to thereby cause a movable contact in the interior of the button to detachably contact with a fixed contact on a substrate, whereby an electric signal is output.

The electronic device 260A is configured to include a central processing unit (CPU), arithmetic means, and storage means such as memory, in which processing or arithmetic operations of input electric signals are carried out in cooperation with software.

When the outer face 203a of the front lid member 203 of the fuel container 201 is inserted along the direction of an arrow C toward the storage section 309 of the electronic device 260A, as shown in FIG. 19. Concurrently, the fuel discharge port 231 is inserted into the mounting groove 261, the air discharge port 232 is inserted into the mounting groove 262, and the water discharge port 233 in the front end portion of the water storage pipe 210 is inserted into the mounting groove 263. Simultaneously, the fuel introduction pipe 264 is inserted into the fuel discharge port 231 to thereby open the check valve 205, the air introduction pipe 265 is inserted into the air discharge port 232 to thereby open the check valve 206, and the water discharge port 266 is inserted to thereby open the check valve 207.

Preferably, the fuel container 201 is set such that in the state that it is stored in the electronic device 260A, the air filter 208 is exposed from a sidewall of the electronic device 260A, however, it does not protrude from the sidewall or downward of the electronic device 260A.

For removal, the fuel container 201 can be removed by pulling the fuel container 201 in the reverse direction of the arrow C.

Figure 21A:
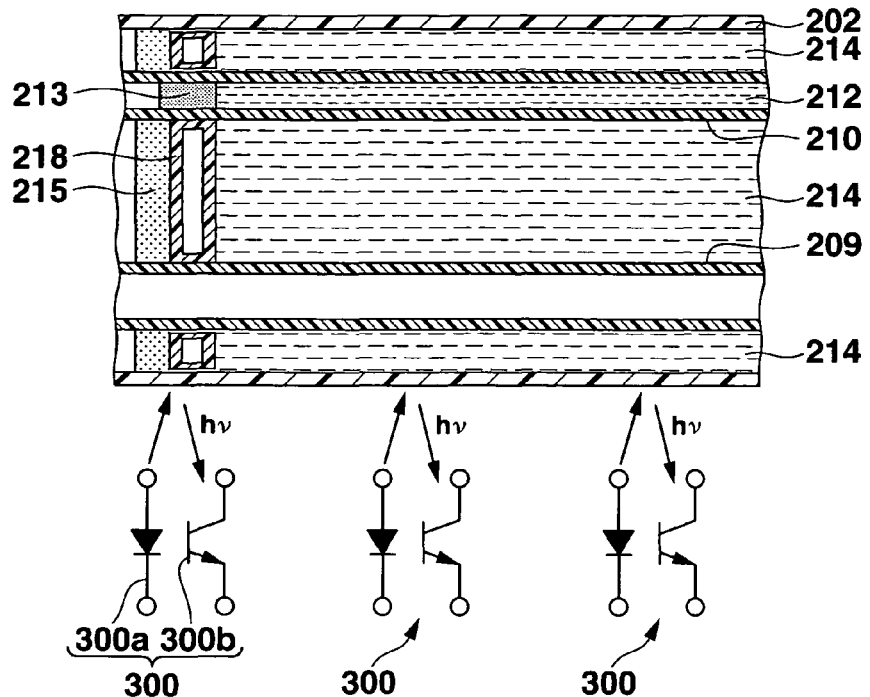
FIG. 21A is a schematic showing that a sensor close to the rear lid member detects the residual amount of liquid fuel.

The fuel residual amount measurement device provided in the electronic device 260A will be described hereinbelow. As shown in FIGS. 19 and 21A, the fuel residual amount measurement device has a control circuit that controls a plurality of sensors 300. The multiple sensors 300 are provided independently of the container body 202 on the outside of the container body 202. The sensors 300 are provided to be spaced away from one another at a predetermined interval, and are exposed on wall faces forming the storage section 309 in such a manner as to oppose the left sidewall of the fuel container 201 shown in FIG. 21A. The sensor 300 has a light emitting diode 300a that irradiates light hv toward the fuel container 201, and a photodiode 300b that receives light hv reflected on the follower auxiliary member 218. When insertion of the fuel container 201 has been detected by the control circuit of the fuel residual amount measurement device, the light emitting diodes 300a emit light at a predetermined time interval. In this event, the position of the follower auxiliary member 218 in the fuel container 201 in the longitudinal direction X of the fuel container 201 follows depending upon the residual amount of the liquid fuel 214 in the fuel container 201. More specifically, the position shifts closer to the rear lid member 204 as the residual amount of the liquid fuel 214 is larger, and the position shifts closer to the front lid member 203 as the residual amount is smaller.

It is assumed that a sufficient residual amount of the liquid fuel 214 is present. In this case, as shown in FIG. 21A, light hv of the light emitting diode 300a is reflected off of the follower auxiliary member 218 in the sensor 300 closer to the rear lid member 204. Then, the light hv is received by the photodiode 300b and a reception intensity signal is output therefrom to the control circuit. However, in the other sensors 300, rays of light hv from the respective light emitting diodes 300a cannot be sufficiently received by the respective photodiodes 300b. In this manner, the control circuit performs comparison and determination of reception light intensity of the photodiode 300b of the sensor 300, thereby to detect the position of the follower auxiliary member 218 and the residual amount of the liquid fuel 214.

Figure 20A:
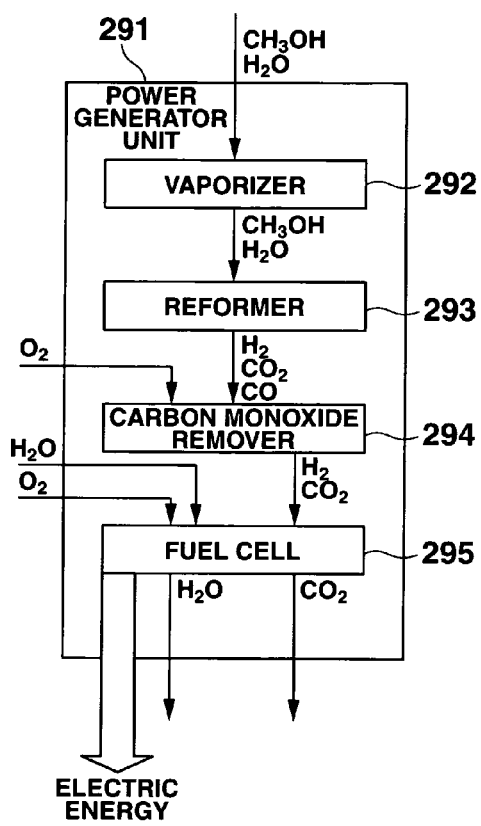
FIGS. 20A and 20B, respectively, are block diagrams of power generator units different from each other.
Figure 20B:
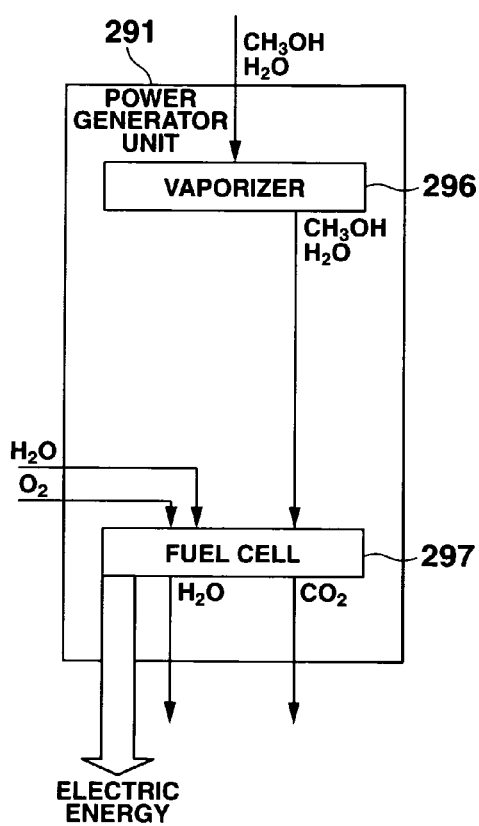

At activation of a power generator unit 291 having a fuel cell 295, 297, as shown in FIGS. 20A and 20B, the water 212 is supplied to the fuel cell as a carrier for hydrogen ions in the event of power generation. After the fuel container 201 is attached to the electronic device 260A, the water 212 drawn from the mounting groove 263 by a small fluid pump 270 is supplied to the power generator unit 291 through a valve 271 (FIG. 17). As the water 212 is supplied to the electronic device 260A, the amount of the water 212 in the water storage pipe 210 is reduced. In conjunction therewith, distortional stresses occur with the follower unit 213, whereby the follower unit 213 contacts the rear-end liquid face of the water 212, and follows the liquid face in that state.

Figure 21B:
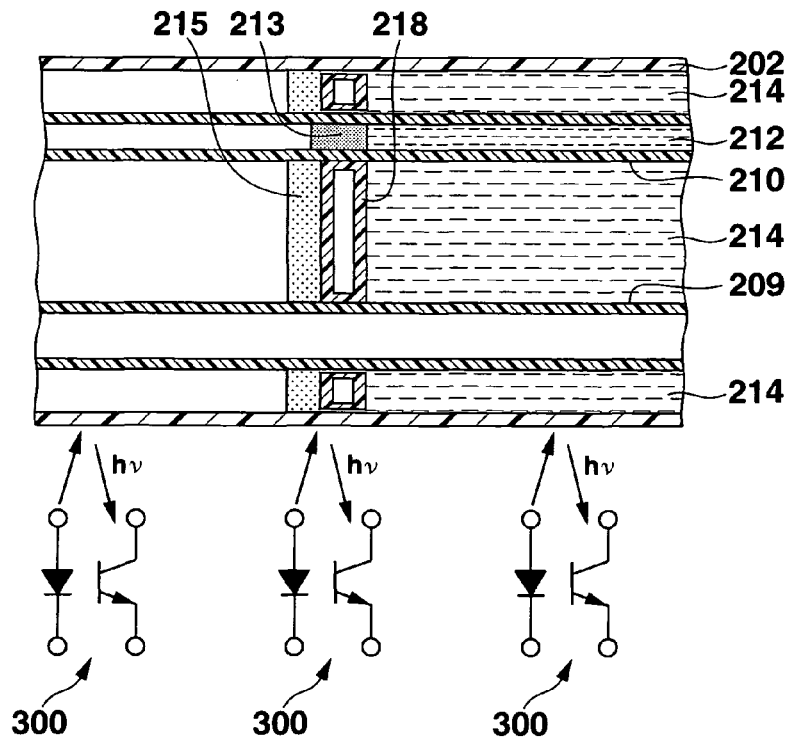
FIG. 21B is a schematic view showing that a central sensor detects the residual amount of the liquid fuel.

In addition, as shown in FIG. 21B, as the liquid fuel 214 in the fuel container 201 is drawn into the power generator unit 291 and reduced, the follower unit 215 and the follower auxiliary member 218 are pulled to maintain the state of the interface in contact with the liquid fuel 214. As such, the front region partitioned by the follower unit 215 and the follower auxiliary member 218 in the fuel container 201 is filled with the liquid fuel 214 without clearances. Consequently, regardless of the postures of, for example, the electronic device 260A and the fuel container 201, the liquid fuel 214 reaches the follower unit 213, and hence the liquid fuel 214 can easily be drawn into the electronic device 260A. In addition, since the movement direction of the follower auxiliary member 218 is restricted by the air pipe 209 and the water storage pipe 210 only to the longitudinal direction X of the fuel container 201, the rear end interface of the liquid fuel 214 does not significantly tilt.

In the above-described state, in the sensor 300 on the central position in the longitudinal direction X of the fuel container 201, the light hv from the light emitting diode 300a is reflected off of the follower auxiliary member 218. Then, the light hv is received by the corresponding photodiode 300b and a reception intensity signal is output therefrom to the control circuit. However, in the other sensors 300, rays of light hv from the respective light emitting diodes 300a cannot be sufficiently received by the respective corresponding photodiodes 300b. In this manner, the control circuit detects the position of the follower auxiliary member 218 and the residual amount of the liquid fuel 214.

In the above-described case, the light emitting diodes 300a do not normally or all time emit light, but emit light periodically and in synchronization. However, the emission timing may be slightly differentiated in units of the sensor 300 so that emission periods of time of the light emitting diodes 300a do not overlap with one another. This is done to prevent error in residual amount determination in the event that an adjacent sensor 300 receives reflected light hv of the follower auxiliary member 218 in response to light hv of a light emitting diode 300a in a predetermined position. In this case, sensors 300 are operated to emit light in the order of their positional closeness either to the front lid member 203 or to the rear lid member 204. Suppose that the reception light intensity of a certain one of the sensors 300 exceeds a threshold value set such that, of the sensors 300, the position of that sensor 300 with respect to the follower auxiliary member 218 is contemplate relatively closest in comparison to the positions of the other sensors 300. In this event, the position of the follower auxiliary member 218 at that time can be measured, so that light emission operations of the light emitting diodes 300a of the other sensors 300 and light emission operations of the photodiode 300b thereof do not have to be performed.

Alternatively, the position of the follower auxiliary member 218 can be determined in such a manner that, in accordance with the position and reception light intensity of a sensor 300 in the position where the reception light intensity is highest as a result of emission of all the light emitting diodes 300a, and the positions and reception light intensities of sensors 300 respectively adjacent to both sides of that sensor 300, an identification position between the adjacent sensors 300 is broken down into multiple positions. In this manner, the residual amount of the liquid fuel 214 can be measured at a larger number of stages than the number of sensors 300.

The liquid fuel 214 drawn by a small fluid pump 268 from the mounting groove 261 is supplied to the power generator unit 291 through a valve 269 (FIG. 17). In the case where a reformer is provided in the power generator unit 291, part of the water 212 is drawn into a fluid pump 272 at activation of reformation activation, is supplied to a mixer 274 through a valve 273, and is mixed together with the liquid fuel 214 supplied through the valve 269 to thereby cause reformation reaction, as described further below.

Preferably, the arithmetic processor circuit of the electronic device 260A functions to detect the residual amount of the liquid fuel 214 in response to detection signals of the sensors 300 and then to cause the display section 303 to display the residual amount. More specifically, the arithmetic processor circuit of the electronic device 260A functions in the manner that when no detection signal has been input from any one of the array of sensors 300, the display section 303 displays that the liquid fuel 214 is in a full state. When a detection signal has been input from any one of the sensors 300, the circuit detects the residual amount of the liquid fuel 214 from the position of the follower auxiliary member 218 corresponding to the sensor 300 from which the detection signal has been input, and causes the display section 303 to display the residual amount.

In the event that the residual amount of the liquid fuel 214 in the fuel container 201 has reached the level corresponding to the time for replacement, it is sufficient to detach the fuel container 201 from the electronic device 260A and to attach a new fuel container 201 to the electronic device 260A. Since the multiple sensors 300 are mounted in the electronic device 260A, the residual amount of liquid fuel 214 in the fuel container 201 can be measured even after replacement with the new fuel container 201. Thus, since no sensors are provided in the fuel container 201, the fuel container 201 can be manufactured at lower costs than in the case of a fuel container 201 in which the sensors 300 are provided.

The electronic device 260A contains the power generator unit 291 shown in FIG. 20A or 20B. In either one of the cases of FIGS. 20A and 20B, although methanol is exemplified for the liquid fuel 214, compounds containing hydrogen elements such as alcohols and gasoline may be used.

In the case of a reformation type fuel cell unit shown in FIG. 20A, the power generator unit 291 is configured to include a vaporizer 292, a reformer 293, a carbon monoxide remover 294, and a fuel cell 295.

A liquid mixture formed by the mixer 274 from the liquid fuel 214 and the water 212 is first supplied to the vaporizer 292. In the vaporizer 292, the supplied liquid mixture is vaporized into a gas mixture of the fuel and the water. The gas mixture thus generated in the vaporizer 292 is supplied to the reformer 293.

In the reformer 293, hydrogen and carbon dioxide are generated from the gas mixture supplied from the vaporizer 292. In more specific, as expressed in chemical formula (8), the gas mixture is reacted through catalyst, thereby to generate carbon dioxide and hydrogen.

$$CH_3OH + H_2O \rightarrow 3H_2 + CO_2 \tag{8}$$

In the reformer 293, a case can occur in which methanol and water vapor are not completely reformed into carbon dioxide and hydrogen. In this case, as in chemical formula (9), the methanol and the water vapor react with each other, thereby to generate carbon dioxide and carbon monoxide.

$$2CH_3OH + H_2O \rightarrow 5H_2 + CO + CO_2 \tag{9}$$

The gas mixture, which has been generated in the reformer 293, is supplied to a carbon monoxide remover 294.

In the carbon monoxide remover 294, the carbon monoxide contained in the gas mixture, which has been supplied from the reformer 293, is selectively oxidized, whereby the carbon monoxide is removed from the gas mixture. More specifically, the carbon monoxide is reacted with oxygen in air through catalyst to thereby generate carbon dioxide, in which the carbon monoxide has been specifically selected from the gas mixture supplied from the reformer 293, and the oxygen in the air supplied from each of valves 276, 278. The supply amount of the oxygen from the valves 276, 278 are detected by sensors 279, 281, and opening and closing of the valve 276 is appropriately controlled by the control circuit in accordance with information received from the sensor 279.

$$2CO + O_2 \rightarrow 2CO_2 \quad (10)$$

The gas mixture is then supplied from the carbon monoxide remover 294 to a fuel electrode of the fuel cell 295.

At the fuel electrode of the fuel cell 295, as expressed in electrochemical formula (11) given below, hydrogen gas of the gas mixture, which has been supplied from the carbon monoxide remover 294, is dissolved into hydrogen ions and electrons through the action of the catalyst of the fuel electrode. The hydrogen ions are conducted to an air electrode through a solid polymer electrolyte film of the fuel cell 295, and electrons are extracted by the fuel electrode. The hydrogen ions are conducted to an air electrode through an electrolyte film, such as a solid polymer electrolyte film, of the fuel cell 295, and electrons are extracted by the fuel electrode. Before the hydrogen gas supplied from the carbon monoxide remover 294 reaches the fuel cell 295, the electrolyte film of the fuel cell 295 is preliminarily humidified by the water 212 stored in the water storage pipe 210 of the fuel container 201. Accordingly, the hydrogen ions being generated during power generation are dehydrated with water contained in the electrolyte, whereby ion conductivity of the electrolyte film can be improved. Consequently, when the hydrogen gas has reached the fuel cell 295, the electrolyte film facilitates the conduction of the hydrogen ions generated from the hydrogen gas.

$$3H_2 \rightarrow 6H^+ + 6e^- \quad (11)$$

The air is supplied from a valve 277 to the air electrode of the fuel cell 295 of the unit 291. Then, as represented in electrochemical formula (12) given below, reaction takes place among the oxygen in the air, the hydrogen ions passed through the solid polymer electrolyte film, and the electrons, thereby to generate water as a bi-product.

$$6H^+ + 3/2O_2 + 6e^- \rightarrow 3H_2O \quad (12)$$

The supply amount of the oxygen from the valve 277 is detected by a sensor 280, and opening and closing of the valve 277 is appropriately controlled by the control circuit in accordance with information received from the sensor 280.

As described above, electric energy is generated through the electrochemical reactions occurred in the fuel cell 295, as represented by the formulas (11) and (12). A gas mixture of the generated products, such as the carbon dioxide and air, is discharged to the outside through a valve 283.

Proportionally to the amount of oxygen consumed for the above-described chemical reactions, the air filter 208 is contaminated or clogged with particles. As the air filter 208 is eventually clogged with particles, draft forces of an air pump 275 is reduced, thereby potentially leading to a reduction in the reaction efficiency. However, since the air filter 208 is mounted in the fuel container 201, the air filter 208 can be together replaced by replacement of the fuel container 201. For this reason, it is sufficient for the air filter 208 to have dust collection capacity necessary only to permit transmission of an oxygen amount corresponding to the amount of the liquid fuel 214 filled in one fuel container 201. More specifically, it is not necessary to provide an air filter of the type capable of performing dust collection for an oxygen amount corresponding to the amount of the liquid fuel 214 filled in multiple fuel containers 201. As such, miniaturization can be implemented. In addition, since high dust collection capacity is not necessary for a long period of time, a relatively coarse air filter can be adapted. Consequently, the oxygen can be efficiently extracted without imposing excessively high loads on the air pump 275. Thus, the air filter 208 is not clogged with particles when drawing air necessary for the liquid fuel 214 of multiple fuel containers 201, so that the air pump 275 does not have to be enlarged in structure to the extent of having air drafting forces sufficient even in a clogged event of the filter. It is assumed that the power generated by the power generator unit 291 is used as a motive-force source of the air pump 275. In this case, of the amount of power generated by the power generator unit 291, the ratio of the amount of power to be supplied to loads such as external electric equipment or devices can be increased, and the ratio of the amount of power required for power generation by the power generator unit 291 can be reduced.

In the case of a direct-fuel fuel cell unit shown in FIG. 20B, the power generator unit 291 is configured to include a vaporizer 296 and a fuel cell 297.

A liquid mixture formed by the mixer 274 from the liquid fuel 214 and the water 212 is vaporized in the vaporizer 296 into a gas mixture of the methanol and water vapor. The gas mixture thus generated in the vaporizer 296 is supplied to a fuel electrode of the fuel cell 297.

At the fuel electrode of the fuel cell 297, as expressed in electrochemical formula (13) given below, the gas mixture, which has been supplied from the vaporizer 296, is dissolved into hydrogen ions, electrons, and carbon dioxide through the action of the catalyst of the fuel electrode. The hydrogen ions are conducted to an air electrode through a solid polymer electrolyte film, and electrons are extracted by the fuel electrode.

At the fuel electrode of the fuel cell 297, as expressed in electrochemical formula (13) given below, the gas mixture, which has been supplied from the vaporizer 296, is dissolved into hydrogen ions, electrons, and carbon dioxide through the action of the catalyst of the fuel electrode. The hydrogen ions are conducted to an air electrode through a solid polymer electrolyte film, and electrons are extracted by the fuel electrode.

As for the electrolyte film of the fuel cell 297, before any one of the liquid fuel 214 supplied from the fuel container 201 reaches the fuel cell 297, the electrolyte film of the fuel cell 297 is preliminarily humidified by the substance stored in the water storage pipe 210 of the fuel container 201. Accordingly, the hydrogen ions being generated during power generation is dehydrated with water contained in the electrolyte, whereby ion conductivity of the electrolyte film can be improved. Consequently, when the liquid fuel 214 has reached the fuel cell 297, the electrolyte film facilitates the conduction of the hydrogen ions.

$$CH_3OH + H_2O \rightarrow CO_2 + 6H^+ + 6e^- \quad (13)$$

The air is supplied from the valve 277 to the air electrode of the fuel cell 297. Then, as represented in electrochemical formula (14) given below, reaction takes place among the oxygen in the air, the hydrogen ions passed through the solid polymer electrolyte film, and the electrons taken by the fuel electrode, thereby to generate water.

$$6H^+ + 3/2O_2 + 6e^- \rightarrow 3H_2O \quad (14)$$

As described above, electric energy is generated through the electrochemical reactions occurred in the fuel cell 297, as represented by the formulas (13) and (14). A gas mixture of the generated products, such as the water, carbon dioxide, and air, is discharged to the outside through the valve 283. In the power generator unit 291 of the direct-fuel fuel cell unit, the vaporizer 296 is not indispensably necessary. In addition, it is sufficient as long as the water and the liquid fuel are preliminarily mixed together and as long as being filled in the fuel container 201 as a mixed solution of the water and the liquid fuel. In this case, the follower unit 215 and the follower auxiliary member 218 are of course provided on the rear end interface of the mixed solution. Accordingly, in this case, it is not indispensably necessary to provide the water 212, follower unit 213, mounting groove 263, small fluid pump 270, valve 271, pump 272, valve 273, and mixer 274 which are shown in FIG. 17.

Even in the case where the power generator unit 291 is any one of the reformation type and the direct fuel type, the water 212 stored in the fuel container 201 is used in the initial operation of the power generator unit 291. However, as shown in the chemical formula (12) or (14), the water generated in the power generator unit 291 during power generation may be supplied again to the power generator unit 291 by the pump 72 and utilized as water for the reaction system on the left side shown in the chemical formula (8) or (13). Alternatively, both the aforementioned water and the water 212 stored in the fuel container 201 may be used. Then, extra water generated in the power generator unit 291 and remained not re-used, as described above, is discharged to the outside through a valve 282.

Suppose that the power generator unit 291 is provided in an electronic device body of, for example, a mobile phone, notebook personal computer, digital camera, personal digital assistance (PDA), or electronic note. In this case, the fuel container 201 is attachable and detachable to and from the electronic device body, and the electronic device body is operated by electric energy generated by the power generator unit 291.

As described above, according to the embodiment of the present invention, the multiple sensors 300 provided to be exposed on the wall face of the storage section 309 of the electronic device 260A irradiate light on the follower auxiliary member 218. Thereby, a variation in the amount of optical reflection is detected, and the position of movement of the follower auxiliary member 218 is optically detected. Accordingly, unlike conventional cases, the residual amount of the liquid fuel 214 is not visually verified, so that the residual amount can be excellently detected even in the case of an achromatic and transparent liquid fuel 214. The pumps 268, 270 and 272, and the valves 269, 271, 273, 276, 277, 278, 282, and 283, the sensors 279, 280 and 281, and the mixer 274 constitute a flow rate control unit 267.

The position of movement of the follower auxiliary member 218 is optically detected. Accordingly, even when the fuel container 201 is once detached and is reattached to the electronic device, the residual amount of the liquid fuel 214 can be verified by detecting the position of movement of the follower auxiliary member 218.

Since the multiple sensors 300 are not provided in the interior of the container body 202, the fuel container 201 is simplified in structure, so that the manufacture thereof is facilitated, and the filling amount of the liquid fuel 214 into the fuel container 201 can be increased. In addition, the container can be used as a consumption article, so that cost reduction can be implemented. Further, recycling can easily be done on the manufacturer side as well.

The present invention is not limited to the embodiment described above, but may be improved and design-changed in various ways without departing from the spirit and scope of the invention.

Figure 22A:
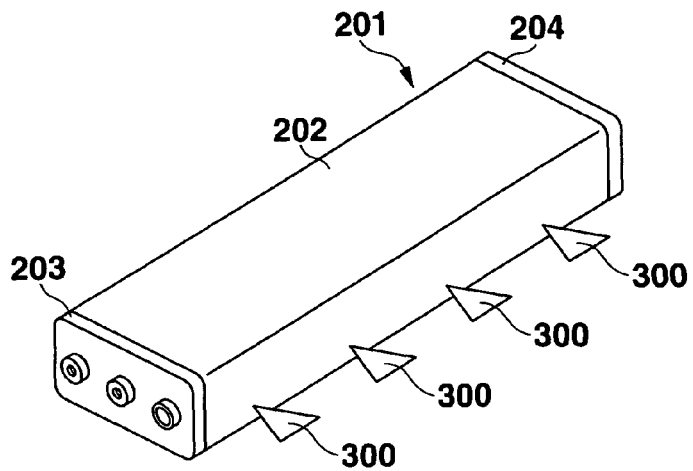
FIG. 22A is a perspective view showing arrangement relationships between the fuel container and a plurality of sensors.
Figure 22B:
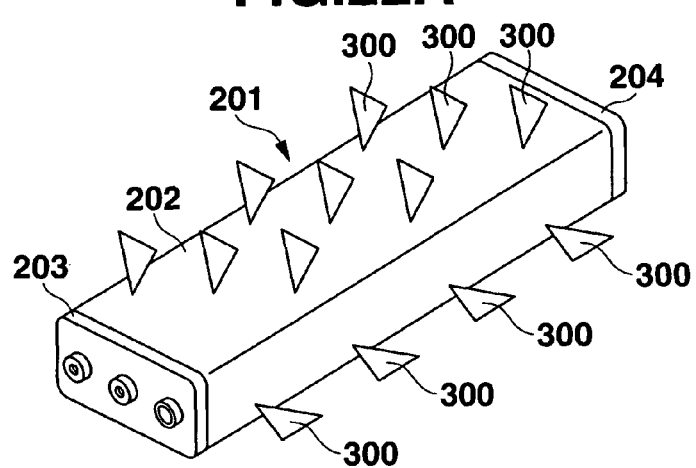
FIG. 22B is a perspective view showing arrangement relationships between the fuel container and the plurality of sensors that performs detection from two directions.

For example, the multiple sensors 300 are arranged to oppose only the left sidewall of the fuel container 201. However, as shown in FIG. 22B, multiple sensors 300 may be further provided on the bottom face of the storage section 309 at a predetermined pitch so as not only to be arranged on the left sidewall of the fuel container 201, but also to be oppositely arranged on the upper surface of the fuel container 201. In this case, any one of the sensors 300 is used to receive reflected light of the follower auxiliary member 218, and the position of the sensor 300 having received the light is detected to be the position of the follower auxiliary member 218. According to such a layout as designed for arranging a plurality of sensors 300 on the multiple faces of the fuel container 201, a large number of the sensors 300 can be arranged even in the case of relatively large sensors 300. Thereby, the residual amount of the liquid fuel 214 can be verified in units of a finely split stage, and hence the residual amount of the liquid fuel 214 can be detected even more accurately.

Figure 22C:
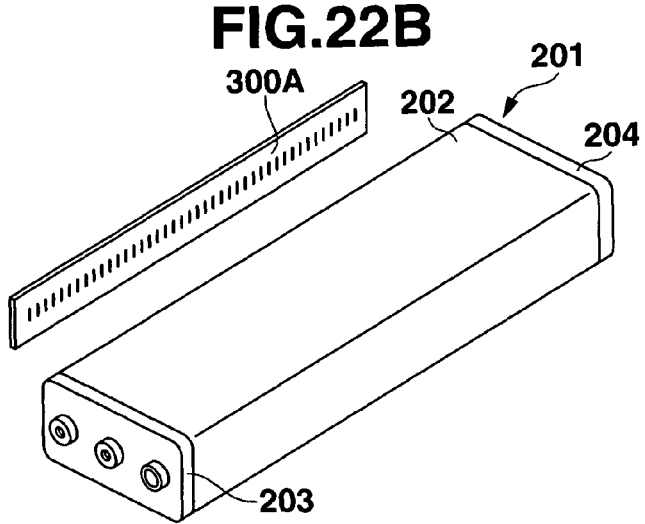
FIG. 22C is a perspective view showing the relationship between the fuel container and a line sensor.

Further, as shown in FIG. 22C, a line sensor 300A having photo-sensor devices such as photodiodes aligned in one line along the longitudinal direction of the fuel container 201 may be provided on a wall face of the storage section 309 so as to oppose the right sidewall of the fuel container 201. In this case, any one of the photo-sensor devices is used to receive reflected light of the follower auxiliary member 218, and the position of the photo-sensor device having received the light is detected to be the position of the follower auxiliary member 218. Usable sensors as the sensors 300 and line sensor 300A specifically include CCD line sensors and C-MOS line sensors. Alternatively, for example, with 100 photo-sensor devices preliminarily formed with respect to the depth width of the fuel container 201, the residual amount of the liquid fuel 214 can be verified in units of a $1/100$ split stage.

Also the arrangement site for the line sensor 300A may be provided on the bottom face of the storage section 309 so that it is oppositely arranged on the upper surface of the fuel container 201.

According to the above-described embodiment, the fuel container 201 has the substantially rectangular parallelepiped shape that is most preferable as it can easily be designed to set fixed distances between the sensors and the follower auxiliary member 218 for the event of performing detection with optical sensors. However, the fuel container 201 may have a different shape such as a circular cylindrical shape as long as the follower auxiliary member 218 can be sufficiently sensed by using sensors.

Further, according to the above-described embodiment, the follower auxiliary member 218 is set as the sense object of the sensor 300, but the follower unit 215 may instead be set as the sense object. In this case, the follower unit 215 is preferably treated to have sensitivity different from that of the liquid fuel 214, such as to be treated in a color like a white-based color having a relatively high reflectance, so that the sensors 300 is able to distinguish it from the liquid fuel 214. In addition, both the follower unit 215 and follower auxiliary member 218 may of course be set to be sense objects of the sensors 300.

What is claimed is:

1. A fuel container comprising:
 a container body having a fuel discharge port and an interior spacing, wherein the interior spacing is separated into a plurality of fuel storage spacings;

a body of liquid fuel provided in the interior spacing of the container body;

a plurality of communication holes which bring each of said plurality of fuel storage spacings into communication with the fuel discharge port;

a follower unit which contacts at least a part of an end of the body of the liquid fuel; and a solid follower auxiliary unit which is interposed between the follower unit and the body of liquid fuel and which is optically detectable, wherein the solid follower auxiliary unit comprises a plurality of follower auxiliary members which are respectively provided in said plurality of fuel storage spacings.

2. The fuel container according to claim 1, wherein at least a part of each of the follower auxiliary members has a color which is different from a color of the liquid fuel.

3. The fuel container according to claim 1, wherein an opening area of at least one communication hole of said plurality of communication holes is different from an opening area of at least another one of the communication holes.

4. The fuel container according to claim 1, wherein said plurality of communication holes each have a different opening area.

5. The fuel container according to claim 1, wherein the liquid fuel is achromatic and transparent.

6. The fuel container according to claim 1, further comprising a water storage section which contains water.

7. A fuel container according to claim 1, wherein the follower unit comprises a plurality of follower members which are respectively provided in said plurality of fuel storage spacings.

8. A fuel residual amount measurement method for measuring a residual amount of liquid fuel of a fuel container, wherein said fuel container comprises (i) a container body having a fuel discharge port and an interior spacing in which the liquid fuel is provided and which is separated into a plurality of fuel storage spacings, (ii) a plurality of communication holes which bring each of said plurality of fuel storage spacings into communication with the fuel discharge port, (iii) a follower unit which contacts at least a part of an end of the body of the liquid fuel, and (iv) a solid follower auxiliary unit which is interposed between the follower unit and the body of liquid fuel and which is optically detectable, said solid follower auxiliary unit comprising a plurality of follower auxiliary members which are respectively provided in said plurality of fuel storage spacings, said method comprising:

detecting positions of the follower auxiliary members; and determining the fuel residual amount based on the detected positions of the follower auxiliary members.

\* \* \* \* \*